US012592191B2

(12) United States Patent
Yu et al.

(10) Patent No.: US 12,592,191 B2
(45) Date of Patent: Mar. 31, 2026

(54) PIXEL DRIVING CIRCUIT AND DRIVING METHOD THEREFOR, AND DISPLAY PANEL AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Zhaowei Yu, Beijing (CN); Rongjian Yan, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 240 days.

(21) Appl. No.: 18/690,963

(22) PCT Filed: May 11, 2023

(86) PCT No.: PCT/CN2023/093662
§ 371 (c)(1),
(2) Date: Mar. 11, 2024

(87) PCT Pub. No.: WO2023/231742
PCT Pub. Date: Dec. 7, 2023

(65) Prior Publication Data

US 2024/0379057 A1 Nov. 14, 2024

(30) Foreign Application Priority Data

May 30, 2022 (CN) ........................ 202210603146.X

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/0861;
(Continued)

(56) References Cited

U.S. PATENT DOCUMENTS 11,361,713 B1 * 6/2022 Fu ........................ G09G 3/3241
12,094,416 B1 * 9/2024 Chen .................. H10K 59/1213
(Continued)

FOREIGN PATENT DOCUMENTS

CN 108597450 A 9/2018
CN 110021273 A 7/2019
(Continued)

OTHER PUBLICATIONS

Notification of Grant of Invention Patent for Chinese Patent Application No. 202210603146.X issued by the Chinese Patent Office on Sep. 6, 2023.

*Primary Examiner* — William Lu
(74) *Attorney, Agent, or Firm* — XSENSUS LLP

(57) ABSTRACT

A pixel driving circuit includes: a first transistor; a writing sub-circuit configured to write a voltage of a first data voltage terminal into a first terminal of the first transistor in response to a signal of a first control signal terminal; a first compensation sub-circuit configured to couple a voltage of a second terminal of the first transistor to a control terminal of the first transistor and store a voltage of the control terminal in response to the signal of the first control signal terminal; a second compensation sub-circuit configured to couple a voltage of a second data voltage terminal to the control terminal of the first transistor in response to a signal
(Continued)

of a second control signal terminal; and a light-emitting control sub-circuit configured to be controlled to form a current path between first and second voltage terminals in response to a signal of the third control signal terminal.

20 Claims, 14 Drawing Sheets

(52) U.S. Cl.
CPC ............... *G09G 2300/0861* (2013.01); *G09G 2310/0251* (2013.01); *G09G 2320/0233* (2013.01); *G09G 2320/041* (2013.01)

(58) Field of Classification Search
CPC ... G09G 2310/0251; G09G 2320/0233; G09G 2320/041; G09G 3/32; G09G 3/3258
See application file for complete search history.

(56) References Cited

U.S. PATENT DOCUMENTS

| | | | | |
|---|---|---|---|---|
| 12,387,684 | B2 * | 8/2025 | Zhang | G09G 3/3258 |
| 2019/0035334 | A1 * | 1/2019 | Lin | G09G 3/3275 |
| 2021/0312861 | A1 * | 10/2021 | Wang | G09G 3/3233 |
| 2022/0028339 | A1 * | 1/2022 | Nie | H10K 59/1213 |
| 2022/0157225 | A1 * | 5/2022 | Choi | G09G 3/32 |
| 2022/0180815 | A1 * | 6/2022 | Kim | G09G 3/3233 |
| 2023/0093830 | A1 * | 3/2023 | Zhang | G09G 3/3233 345/690 |
| 2023/0351969 | A1 * | 11/2023 | Zhang | G09G 3/3258 |
| 2025/0124861 | A1 * | 4/2025 | Gao | G09G 3/32 |

FOREIGN PATENT DOCUMENTS

| | | | | | |
|---|---|---|---|---|---|
| CN | 112382237 | A | | 2/2021 | |
| CN | 112509523 | A | | 3/2021 | |
| CN | 113571016 | A | | 10/2021 | |
| CN | 113950715 | A | | 1/2022 | |
| CN | 114927102 | A | | 8/2022 | |
| JP | 2007248984 | A | * | 9/2007 | G09G 3/3692 |
| JP | 2007-316356 | A | | 12/2007 | |
| WO | WO-2018076645 | A1 | * | 5/2018 | G11C 19/28 |

* cited by examiner

PIXEL DRIVING CIRCUIT AND DRIVING METHOD THEREFOR, AND DISPLAY PANEL AND DISPLAY APPARATUS

CROSS-REFERENCE TO RELATED APPLICATIONS

This application is a national phase entry under 35 USC 371 of International Patent Application No. PCT/CN2023/093662, filed on May 11, 2023, which claims priority to Chinese Patent Application No. 202210603146.X, filed on May 30, 2022, which are incorporated herein by reference in their entirety.

TECHNICAL FIELD

The present disclosure relates to the field of display technologies, and in particular, to a pixel driving circuit, a driving method for a pixel driving circuit, a display panel, and a display apparatus.

BACKGROUND

In the field of display technology, organic light-emitting diode (OLED) display apparatuses have been increasingly used in high-performance display apparatuses due to their advantages such as wide color gamut, high contrast, energy saving, and good foldable performance.

The OLED display apparatus includes a plurality of sub-pixels, and the plurality of sub-pixels each include a pixel driving circuit and a light-emitting device that are in one-to-one correspondence. When the OLED display apparatus is working at high temperature, the threshold voltage of the driving transistor in the pixel driving circuit of each sub-pixel will shift, thus causing inconsistent driving current for driving the light-emitting device to emit light in each sub-pixel, resulting in abnormal display of the OLED apparatus.

SUMMARY

In an aspect, a pixel driving circuit is provided. The pixel driving circuit includes a first transistor, a writing sub-circuit, a first compensation sub-circuit, a second compensation sub-circuit and a light-emitting control sub-circuit.

The writing sub-circuit is coupled to a first control signal terminal, a first data voltage terminal and a first terminal of the first transistor. The writing sub-circuit is configured to write a voltage of the first data voltage terminal into the first terminal of the first transistor in response to a signal of the first control signal terminal.

The first compensation sub-circuit is coupled to the first control signal terminal, a second terminal of the first transistor, a control terminal of the first transistor and a first voltage terminal. The first compensation sub-circuit is configured to couple a voltage of the second terminal of the first transistor to the control terminal of the first transistor and store a voltage of the control terminal of the first transistor in response to the signal of the first control signal terminal.

The second compensation sub-circuit is coupled to a second control signal terminal, the control terminal of the first transistor and a second data voltage terminal. The second compensation sub-circuit is configured to couple a voltage of the second data voltage terminal to the control terminal of the first transistor in response to a signal of the second control signal terminal. The voltage of the second data voltage terminal is determined by the voltage of the first data voltage terminal and a threshold voltage of the first transistor within a preset temperature range.

The light-emitting control sub-circuit is coupled to the first voltage terminal, a third control signal terminal, the first terminal of the first transistor, the second terminal of the first transistor and an anode of a light-emitting device. A cathode of the light-emitting device is coupled to a second voltage terminal. The light-emitting control sub-circuit is configured to be controlled to form a current path between the first voltage terminal and the second voltage terminal in response to a signal of the third control signal terminal, so as to drive the light-emitting device to emit light.

In some embodiments, the second compensation sub-circuit is further configured to write the voltage of the control terminal of the first transistor into the second data voltage terminal in response to the signal of second control signal terminal.

In some embodiments, the second compensation sub-circuit includes a second transistor, a control terminal of the second transistor is coupled to the second control signal terminal, a first terminal of the second transistor is coupled to the second data voltage terminal, and a second terminal of the second transistor is coupled to the control terminal of the first transistor.

In some embodiments, the first compensation sub-circuit includes a third transistor and a first transistor; a control terminal of the third transistor is coupled to the first control signal terminal, a first terminal of the third transistor is coupled to the second terminal of the first transistor, and a second terminal of the third transistor is coupled to the control terminal of the first transistor and a first terminal of the first capacitor; a second terminal of the first capacitor is coupled to the first voltage terminal; the third transistor is configured to be turned on in response to the signal of the second control signal terminal such that the voltage of the second terminal of the first transistor is coupled to the control terminal of the first transistor; and the first capacitor is configured to store the voltage of the control terminal of the first transistor.

In some embodiments, the writing sub-circuit includes a fourth transistor, a control terminal of the fourth transistor is coupled to the first control signal terminal, a first terminal of the fourth transistor is coupled to the first data voltage terminal, and a second terminal of the fourth transistor is coupled to the first terminal of the first transistor.

In some embodiments, the light-emitting control sub-circuit includes a fifth transistor and a sixth transistor; a control terminal of the fifth transistor is coupled to the third control signal terminal, a first terminal of the fifth transistor is coupled to the second terminal of the first transistor, and a second terminal of the fifth transistor is coupled to the anode of the light-emitting device; and a control terminal of the sixth transistor is coupled to the third control signal terminal, a first terminal of the sixth transistor is coupled to the first voltage terminal, and a second terminal of the sixth transistor is coupled to the first terminal of the first transistor.

In some embodiments, the pixel driving circuit further includes a first initialization sub-circuit and a second initialization sub-circuit.

The first initialization sub-circuit is coupled to a fourth control signal terminal, a first reset voltage terminal and the control terminal of the first transistor. The first initialization sub-circuit is configured to transmit a voltage of the first reset voltage terminal as a reset voltage to the control terminal of the first transistor in response to a signal of the fourth control signal terminal.

The second initialization sub-circuit is coupled to a fifth control signal terminal, a second reset voltage terminal and the anode of the light-emitting device. The second initialization sub-circuit is configured to transmit a voltage of the second reset voltage terminal as a reset voltage to the anode of the light-emitting device in response to a signal of the fifth control signal terminal.

In another aspect, a display panel is provided. The display panel includes a plurality of sub-pixels, and each sub-pixel includes the light-emitting device and the pixel driving circuit as described in any one of the above embodiments.

In yet another aspect, a display apparatus is provided. The display apparatus includes a flexible printed circuit board and the display panel as described in any one of the above embodiments. The flexible circuit board is electrically connected to the display panel.

In yet another aspect, a driving method for a pixel driving circuit is provided. The driving method for the pixel driving circuit is applied to the pixel driving circuit as described in any one of the above embodiments. A driving cycle of the driving method for the pixel driving circuit includes a charging phase and a light-emitting phase. The method includes:

- in the charging phase, through the first control signal terminal, controlling the writing sub-circuit to write the voltage of the first data voltage terminal into the first terminal of the first transistor; and controlling the first compensation sub-circuit to couple the voltage of the second terminal of the first transistor to the control terminal of the first terminal and to store the voltage of the control terminal of the first transistor; and
- in the light-emitting phase, through the second control signal terminal, controlling the second compensation sub-circuit to couple the voltage of the second data voltage terminal to the control terminal of the first transistor; and through the third control signal terminal, controlling the light-emitting control sub-circuit to form the current path between the first voltage terminal and the second voltage terminal to drive the light-emitting device to emit light.

In some embodiments, the method further includes:

- in the charging phase, through the second control signal terminal, controlling the second compensation sub-circuit to write the voltage of the control terminal of the first transistor into the second data voltage terminal, the voltage of the second data voltage terminal being determined by the voltage of the first data voltage terminal and a threshold voltage of the first transistor within a preset temperature range.

In some embodiments, the pixel driving circuit further includes: a first initialization sub-circuit and a second initialization sub-circuit; the first initialization sub-circuit is coupled to a fourth control signal terminal, a first reset voltage terminal and the control terminal of the first transistor; and the second initialization sub-circuit is coupled to a fifth control signal terminal, a second reset voltage terminal and the anode of the light-emitting device. The driving cycle of the driving method for the pixel driving circuit further includes a refresh phase. The method further includes:

- in the refresh phase, through the fourth control signal terminal, controlling the first initialization sub-circuit to transmit a voltage of the first reset voltage terminal as a reset voltage to the control terminal of the first transistor; and
- in the charging stage, through the fifth control signal terminal, controlling the second initialization sub-circuit to transmit a voltage of the second reset voltage terminal as a reset voltage to the anode of the light-emitting device.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
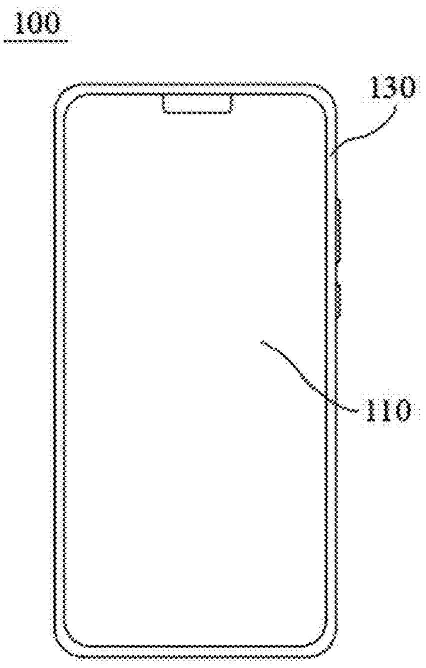
FIG. 1 is a structural diagram of a display apparatus, in accordance with some embodiments.

The technical solutions in embodiments of the present disclosure will be described clearly and completely with reference to the accompanying drawings. However, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, features defined with "first" and "second" may explicitly or implicitly include one or more of the features. In the description of the embodiments of the present disclosure, the terms "a plurality of", "the plurality of" and "multiple" each mean two or more unless otherwise specified.

Some embodiments may be described using the terms "coupled", "connected" and their derivatives. The term "connected" should be understood in a broad sense. For example, the term "connected" may indicate a fixed connection, a detachable connection, or an integrated connection; it may indicate a direct connection or an indirect connection through an intermediate medium. The term "coupled" indicates, for example, that two or more components are in direct physical or electrical contact. The term "coupled" or "communicatively coupled" may also indicate that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

Additionally, the use of the phrase "based on" is meant to be open and inclusive, since a process, step, calculation or other action that is "based on" one or more of the stated conditions or values may, in practice, be based on additional conditions or value beyond those stated.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The term such as "parallel", "perpendicular" or "equal" as used herein includes a stated case and a case similar to the stated case within an acceptable range of deviation determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including deviations due to, for example, manufacturing. For example, an etched region shown as a rectangle shape generally has a feature of being curved. Therefore, the regions shown in the accompanying drawings are schematic in nature, and their shapes are not intended to show actual shapes of regions in a device, and are not intended to limit the scope of the exemplary embodiments.

In the field of display technology, OLED display apparatuses have been increasingly used in high-performance display apparatuses due to their advantages such as wide color gamut, high contrast, energy saving, and good foldable performance.

As shown in FIG. 1, some embodiments of the present disclosure provide a display apparatus 100, and the display apparatus 100 may be an electronic apparatus that displays videos or static images. More specifically, it is expected that some embodiments of the present disclosure may be implemented in or associated with a plurality of electronic apparatuses. The variety of electronic apparatuses may be (but not limited to), for example, mobile phones, wireless apparatuses, personal data assistants (PDAs), hand-held or portable computers, global positioning system (GPS) receivers/navigators, cameras, MPEG-4 Part 14 (MP4) video players, video cameras, game consoles, watches, clocks, calculators, television monitors, flat panel displays, computer monitors, automobile displays (e.g., odometer displays), navigators, cockpit controllers and/or displays, camera view displays (e.g., rear-view camera displays in vehicles), electronic photos, electronic billboards or signs, projectors, architectural structures, packaging and aesthetic structures (e.g., displays of images of a piece of jewelry).

In some embodiments, the display apparatus 100 includes a display module 110 and a housing 130.

Figure 2:
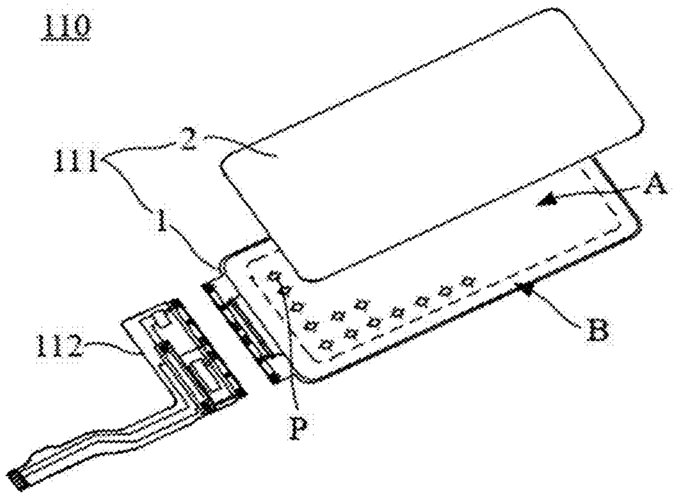
FIG. 2 is a structural diagram of a display module, in accordance with some embodiments.

In some embodiments, as shown in FIG. 2, the display module 110 includes a display panel 111, a flexible printed circuit board 112 and other electronic components.

A type of the display panel 111 varies, which may be selected according to actual needs.

For example, the display panel 111 may be an electroluminescent display panel, such as an organic light-emitting diode (OLED) display panel, a quantum dot light-emitting diode (QLED) display panel, or the like, which is not specifically limited in the embodiments of the present disclosure.

Some embodiments of the present disclosure will be schematic described below by taking an example in which the display panel 111 is an OLED display panel.

Figure 3:
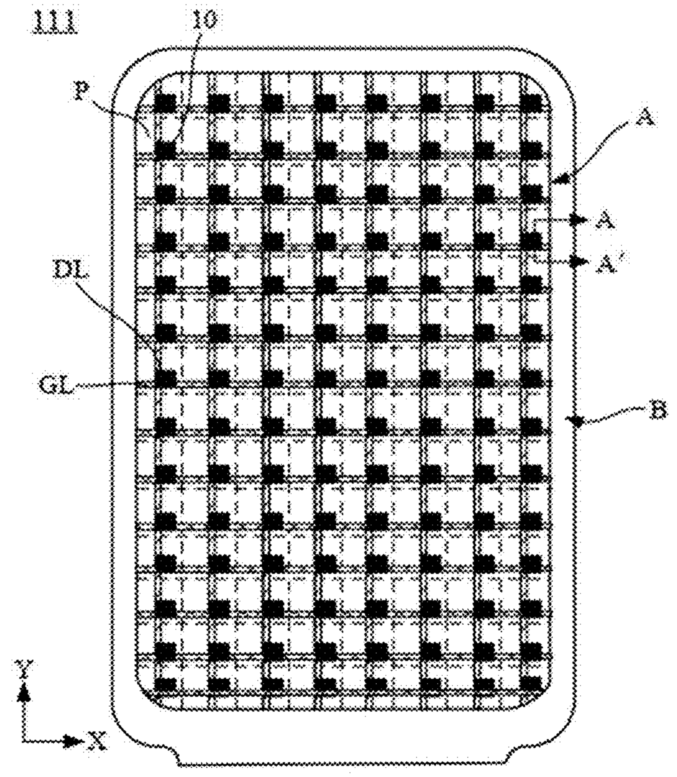
FIG. 3 is a structural diagram of a display panel, in accordance with some embodiments.

In some embodiments, as shown in FIGS. 2 and 3, the display panel 111 has a display region A and a peripheral region B disposed on at least one side of the display region A. FIGS. 2 and 3 both illustrate an example in which the peripheral region B is disposed around the display region A.

The display region A is a region where images are displayed, and the display region A is configured to be provided therein with a plurality of sub-pixels P. The peripheral region B is a region where no image is displayed, and the peripheral region B is configured to be provided therein with display driving circuits, such as a gate driving circuit and a source driving circuit.

For example, as shown in FIGS. 2 and 3, the display panel 111 includes a plurality of sub-pixels P disposed on a side of a substrate 1 and located in the display region A. In some examples, the plurality of sub-pixels P include at least sub-pixels of a first color, sub-pixels of a second color and sub-pixels of a third color. For example, the first color, the second color and the third color may be three primary colors (e.g., red, green and blue).

The plurality of sub-pixels P are arranged in a plurality of rows and a plurality of columns, each row includes multiple sub-pixels P arranged in a first direction X, and each column includes multiple sub-pixels P arranged in a second direction Y. Each row of sub-pixels P may include a plurality of sub-pixels 2, and each column of sub-pixels 2 may include a plurality of sub-pixels 2.

Here, the first direction X and the second direction Y intersect each other. An included angle between the first direction X and the second direction Y may be set according to actual needs. For example, the included angle between the first direction X and the second direction Y may be 85°, 89° or 90°.

Figure 4:
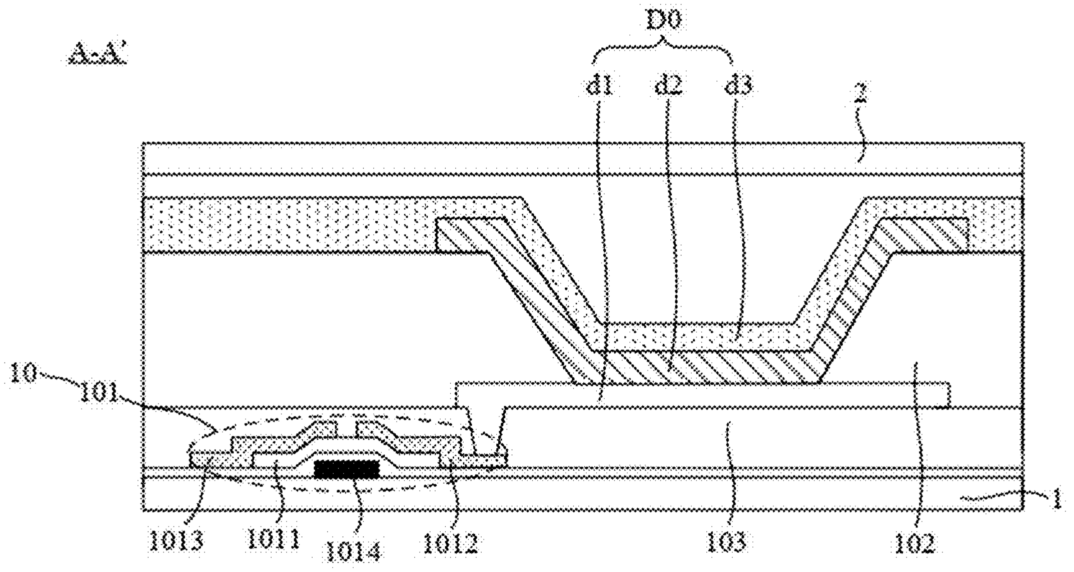
FIG. 4 is a sectional view taken along the section line A-A' in FIG. 3.

As shown in FIGS. 3 and 4, the sub-pixel P includes a light-emitting device D0 and a pixel driving circuit 10 that are disposed on the substrate 1. The pixel driving circuit 10 includes a plurality of transistors 101. The transistor 101 includes an active layer 1011, a source 1012, a drain 1013 and a gate 1014. The source 1012 and the drain 1013 are in contact with the active layer 1011. The light-emitting device D0 includes a first electrode layer d1, a light-emitting functional layer d2 and a second electrode layer d3 sequentially arranged in a direction perpendicular to the substrate 1 and away from the substrate 1. The first electrode layer d1 is electrically connected to a source 1012 or a drain 1013 of at least one transistor 101 among the plurality of transistors 101. FIG. 4 only illustrates an example in which the first electrode layer d1 is electrically connected to the source 1012 of the transistor 101.

It should be noted that positions of the source 1012 and the drain 1013 as mentioned above may be interchanged, that is, 1012 in FIG. 4 may also represent the drain, and 1013 in FIG. 4 may also represent the source.

In some embodiments, the light-emitting functional layer d2 only includes a light-emitting layer. In some other embodiments, the light-emitting functional layer d2 includes a light-emitting layer, and further includes at least one of an electron transport layer (ETL), an electron injection layer (EIL), a hole transport layer (HTL) or a hole injection layer (HIL).

In some embodiments, as shown in FIG. 4, the display panel 111 further includes a pixel defining layer 102, the pixel defining layer 102 includes a plurality of openings, and a single light-emitting device 15 corresponds to a single opening.

In some embodiments, as shown in FIG. 4, the display panel 111 further includes a first planarization layer 103 disposed between the transistor 101 and the first electrode layer d1.

In some embodiments, as shown in FIGS. 2 and 4, the display panel 111 further includes an encapsulation layer 2 disposed on a side of the light-emitting device D0 away from the substrate 1. The encapsulation layer 2 may be an encapsulation film or an encapsulation cover plate.

In some embodiments, as shown in FIGS. 2 and 3, the display panel 111 further includes a plurality of gate lines GL and a plurality of data lines DL that are disposed on a side of the substrate 1 and located in the display region A. The plurality of gate lines GL extend in the first direction X, and the plurality of data lines DL extend in the second direction Y.

For example, sub-pixels P arranged in a row in the first direction X are referred to as sub-pixels P in a same row, and sub-pixels P arranged in a column in the second direction Y are referred to as sub-pixels P in a same column. The sub-pixels P in the same row may be electrically connected to a same gate line GL, and the sub-pixels P in the same column may be electrically connected to a same data line DL.

Each sub-pixel P includes a pixel driving circuit 10 and a light-emitting device electrically connected to the pixel driving circuit 10. A gate line GL is electrically connected to a plurality of pixel driving circuits 10 in sub-pixels P in the same row, and a data line DL is electrically connected to a plurality of pixel driving circuits 10 in sub-pixels P in the same column.

The pixel driving circuit 10 in each sub-pixel P can receive a gate driver on array (GOA) signal through the gate line GL, and receive a voltage signal of a data voltage terminal through the data line DL, so that the pixel driving circuit 10 drives, under control of the GOA signal, the corresponding light-emitting device D0 to emit light according to the voltage signal of the data voltage terminal.

Figure 5:
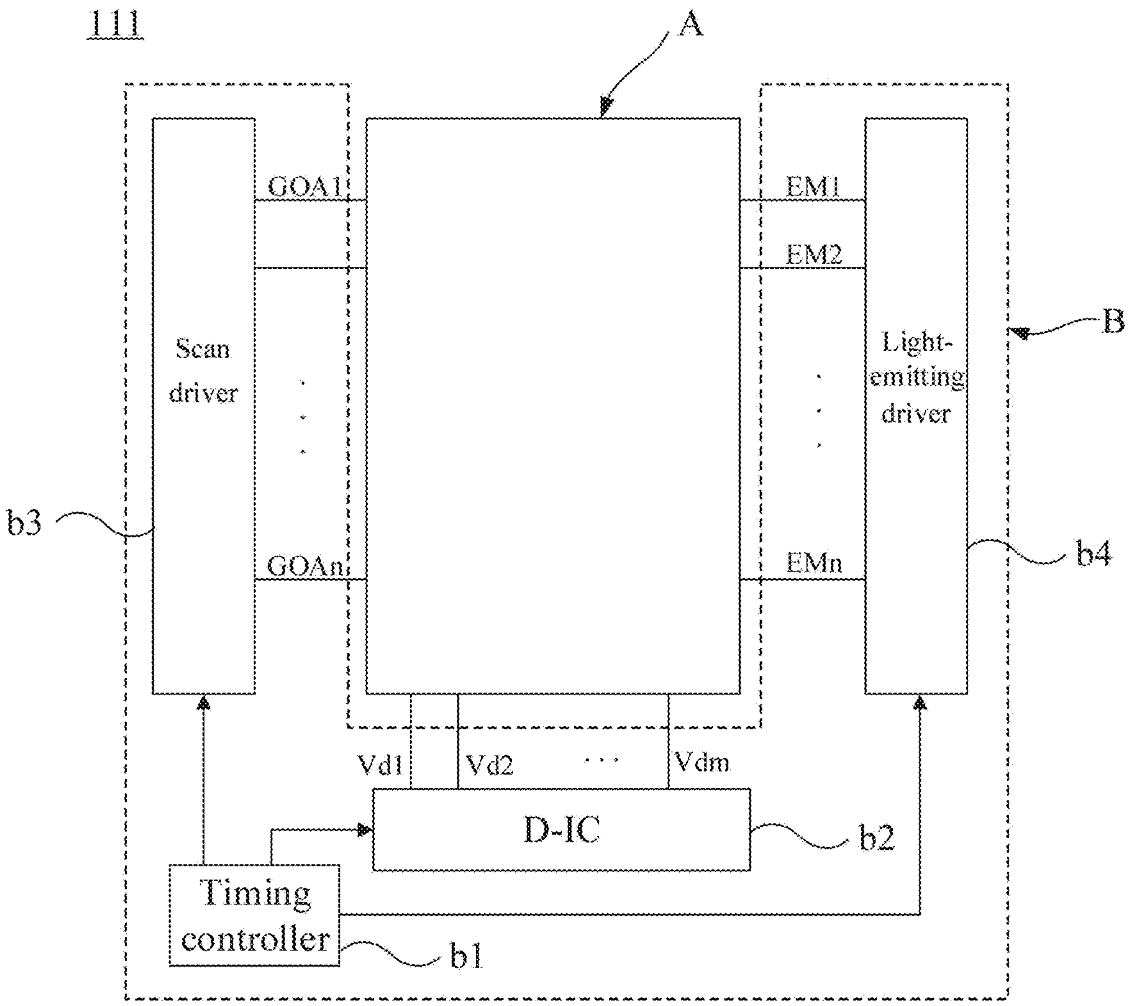
FIG. 5 is a structural diagram of another display panel, in accordance with some embodiments.

Correspondingly, in some embodiments, as shown in FIG. 5, the display panel 111 may include a timing controller b1, a driver integrated circuit (D-IC) b2, a scan driver b3 and a light-emitting driver b4 in the peripheral region B. The timing controller b1 is electrically connected to the D-IC b2, the scan driver b3 and the light-emitting driver b4. The timing controller b1 is used to control the D-IC b2, the scan driver b3 and the light-emitting driver b4, so as to transmit timings of electrical signals to the plurality of sub-pixels P in the display region A. The D-IC b2 is electrically connected to the plurality of columns of sub-pixels P in the display region A through the plurality of data lines DL, and the D-IC b2 may be used to transmit voltage signals Vdata of data voltage terminals to the plurality of columns of sub-pixels P. The scan driver b3 is electrically connected to the plurality of rows of sub-pixels P in the display region A through the plurality of gate lines GL, and the scan driver b3 may be used to transmit GOA signals (e.g., signals of reset control signal terminals Rst, signals of scan control signal terminals Gate, etc.) to the plurality of rows of sub-pixels P. The light-emitting driver b4 is electrically connected to the plurality of rows of sub-pixels P in the display region A through a plurality of light-emitting control signal lines, and the light-emitting driver b4 may be used to transmit light-emitting control signals EM to the plurality of rows of sub-pixels P.

Figure 6:
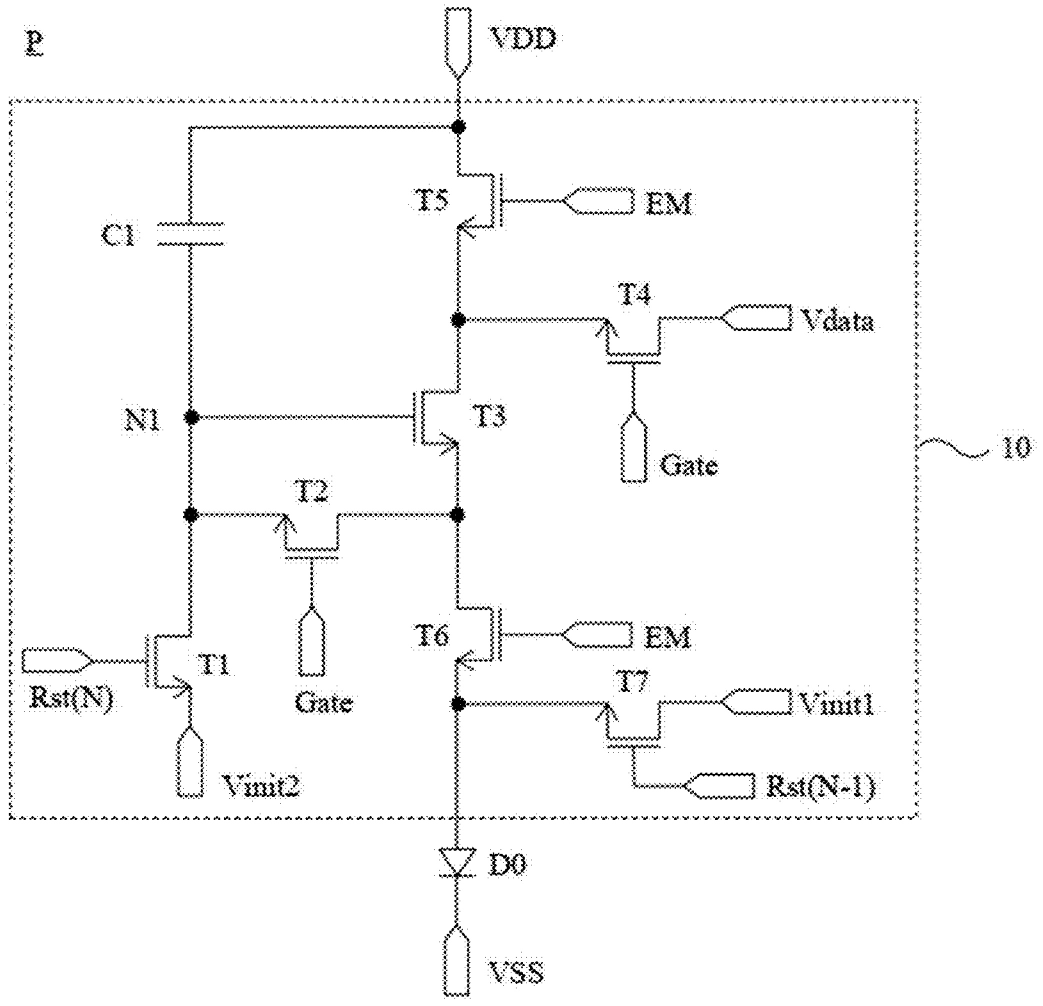
FIG. 6 is a structural diagram of a pixel driving circuit in the related art.
Figure 7:
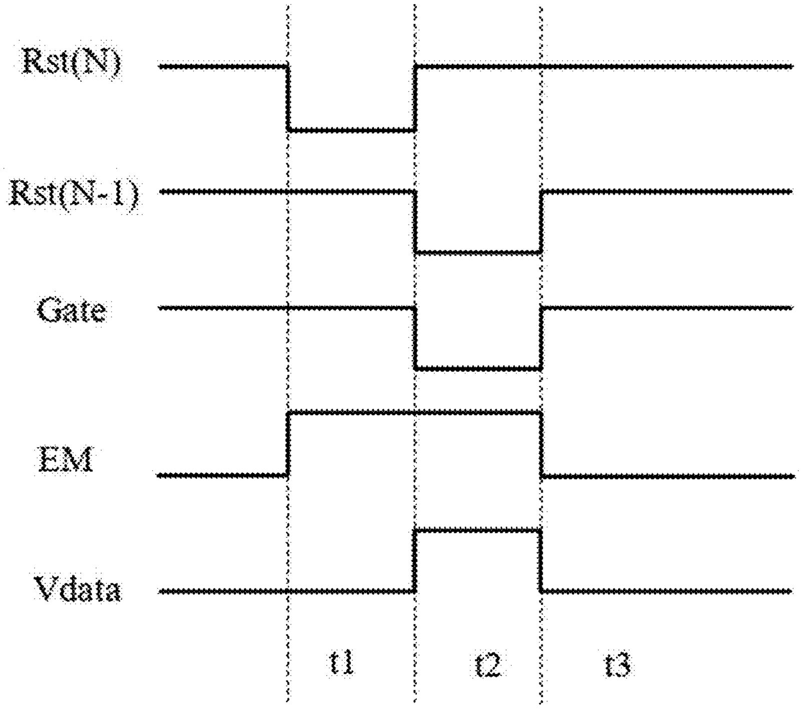
FIG. 7 is a timing diagram of a driving method for a pixel driving circuit in the related art.

Referring to FIGS. 6 and 7, a structure and working process of a sub-pixel P in the related art will be described below.

As shown in FIG. 6, in the related art, for example, the pixel driving circuit 10 in the sub-pixel P includes seven low temperature polysilicon (LTPS) thin film transistors (TFTs) and one capacitor C1 (that is, the pixel driving circuit 10 is of a "7T1C" structure). For example, the seven LTPS-TFTs are a transistor T1, a transistor T2, a transistor T3, a transistor T4, a transistor T5, a transistor T6, and a transistor T7, respectively. The transistor T3 is a driving transistor.

In the sub-pixel P, a control terminal of a transistor T1 in a pixel driving circuit 10 of each sub-pixel P is coupled to a reset control signal terminal Rst(N) of a row where the sub-pixel P is located, and a first terminal of the transistor T1 is coupled to a second reset voltage terminal Vinit2, and a second terminal of the transistor T1 is coupled to a control terminal of the transistor T3. A control terminal of the transistor T2 is coupled to a scan control signal terminal Gate, a first terminal of the transistor T2 is coupled to the control terminal of the transistor T2, and a second terminal of the transistor T2 is coupled to a second terminal of the transistor T3. A first terminal of the capacitor C1 is coupled to a first voltage terminal VDD, and a second terminal of the capacitor C1 is coupled to the control terminal of the transistor T3. A control terminal of the transistor T4 is coupled to the scan control signal terminal Gate, a first terminal of the transistor T4 is coupled to a data voltage terminal Vdata, and a second terminal of the transistor T4 is coupled to a first terminal of the transistor T3. A control terminal of the transistor T5 is coupled to a light-emitting control signal terminal EM, a first terminal of the transistor T5 is coupled to the first voltage terminal VDD, and a second terminal of the transistor T5 is coupled to the first terminal of the transistor T3. A control terminal of the transistor T6 is coupled to the light-emitting control signal terminal EM, a first terminal of the transistor T6 is coupled to a second terminal of the transistor T3, and a second terminal of the transistor T6 is coupled to an anode of the light-emitting device D0. A control terminal of the transistor T7 is coupled to a reset control signal terminal Rst(N−1) of a row previous to the row where the sub-pixel P is located, a first terminal of the transistor T7 is coupled to a first reset voltage terminal Vinit1, and a second terminal of the transistor T7 is coupled to the anode of the light-emitting device D0. A cathode of the light-emitting device D0 is coupled to a second voltage terminal VSS.

Referring to FIGS. 6 and 7, a driving cycle of the pixel driving circuit 10 in the related art is divided into three phases t1, t2 and t3.

In the t1 phase, a signal of the reset control signal terminal Rst(N) of the row where the sub-pixel P is located is at a low level, and a signal of the reset control signal terminal Rst(N−1) of the row previous to the row where the sub-pixel P is located, a signal of the scan control signal terminal Gate and a signal of the light-emitting control signal terminal EM are each at a high level. That is, in the t1 phase, the transistor T1 is turned on, the transistor T2, the transistor T4, the transistor T5, the transistor T6 and the transistor T7 are all turned off. The transistor T1 is turned on, so that a voltage Vinit2 of the second reset voltage terminal Vinit2 may be transmitted to the control terminal of the transistor T3 through the transistor T1 to reset the control terminal of the transistor T3.

In the t2 phase, the signal of the reset control signal terminal Rst(N−1) of the row previous to the row where the sub-pixel P is located and the signal of the scan control signal terminal Gate are at low levels, and the signal of the reset control signal terminal Rst(N) of the row where the sub-pixel P is located and the signal of the light-emitting control signal terminal EM are at high levels. That is, in the phase t2, the transistor T2, the transistor T4, and the transistor T7 are all turned on, and the transistor T1, the transistor T5, and the transistor T6 are all turned off. The transistor T2 is turned on, so that the control terminal and the second terminal of the transistor T3 are connected through the transistor T2, that is, the transistor T3 is presented as a diode structure. The transistor T4 is turned on, so that a voltage of the data voltage terminal Vdata may be written into the first terminal of the transistor T3 through the transistor T4, and written into the control terminal of the transistor T3 through the transistor T3 and the transistor T2. In this case, the control terminal of the transistor T3 will continue to write the voltage until the transistor T3 is turned off. When the transistor T3 is turned off, a voltage of control terminal of the transistor T3 (i.e., a potential of a point N1 in FIG. 6) can be expressed as a sum of the voltage of the data voltage terminal Vdata and the threshold voltage Vth of the transistor T3 (i.e., Vdata+Vth). The voltage (Vdata+Vth) of the control terminal of the transistor T3 is stored in the capacitor C1. The transistor T7 is turned on, so that the voltage Vinit1 of the first reset voltage terminal Vinit1 may be transmitted to the anode of the light-emitting device D0 through the transistor T7 to reset the anode of the light-emitting device D0.

In the t3 phase, the signal of the light-emitting control signal terminal EM is at a low level, and the signal of the reset control signal terminal Rst(N) of the row where the sub-pixel P is located, the signal of the reset control signal terminal Rst(N−1) of the row previous to the row where the sub-pixel P is located and the signal of the scan control signal terminal Gate are at high levels. That is, in this phase t3, the transistor T5 and the transistor T6 are turned on, and the transistor T1, the transistor T2, the transistor T4, and the transistor T7 are all turned off. The transistor T5 is turned on, so that the voltage VDD of the first voltage terminal VDD may be written into the first terminal of the transistor T3 through the transistor T5. In this case, the voltage of the first terminal of the transistor T3 changes from Vdata in the t2 phase to VDD, the transistor T3 is turned on, and the gate-source voltage Vgs of the transistor T3 is equal to a difference between the voltage (Vdata+Vth) of the control terminal and the voltage VDD of the first terminal, i.e., (Vdata+Vth)−VDD. The transistor T3, the transistor T5 and the transistor T6 are all turned on, so that a current path is formed between the first voltage terminal VDD and the second voltage terminal VSS, and the light-emitting device D0 can be driven to emit light. Moreover, the driving current I input to the light-emitting device D0 is equal to the current flowing through the transistor T3. The driving current I may be expressed by the following formula (1):

$$I = K(Vgs - Vth)^2 = K(Vdata - VDD)^2 \quad (1)$$

Here, K is a coefficient, and $$K = \frac{W}{2L}\mu C_{OX}$$

where W/L is a width-to-length ratio of the transistor T3; Cox is a capacitance of a gate insulating layer of the transistor T3; and μ is a carrier mobility of the transistor T3.

Based on the above formula (1), it can be seen that the magnitude of the driving current I does not depend on the threshold voltage Vth of the driving transistor T3, thus realizing an internal compensation of the threshold voltage Vth of the driving transistor T3.

However, when the display apparatus works for a long time and at a high temperature, the threshold voltage of the driving transistor in the pixel driving circuit of each sub-pixel will shift (that is, the threshold voltage will fluctuate within a certain range). In this case, in the t2 phase of the driving cycle, when the driving transistor in each sub-pixel are charged to be turned off, the voltage Vdata written into the control terminal of the driving transistor through the data voltage terminal Vdata is inconsistent. In this case, based on the above formula (1), the magnitude of the driving current I output by the driving transistor in each sub-pixel is also inconsistent. As a result, brightness of light emitted by light-emitting devices in sub-pixels of different colors is inconsistent, causing an abnormal display problem such as color cast in the display apparatus.

Figure 8:
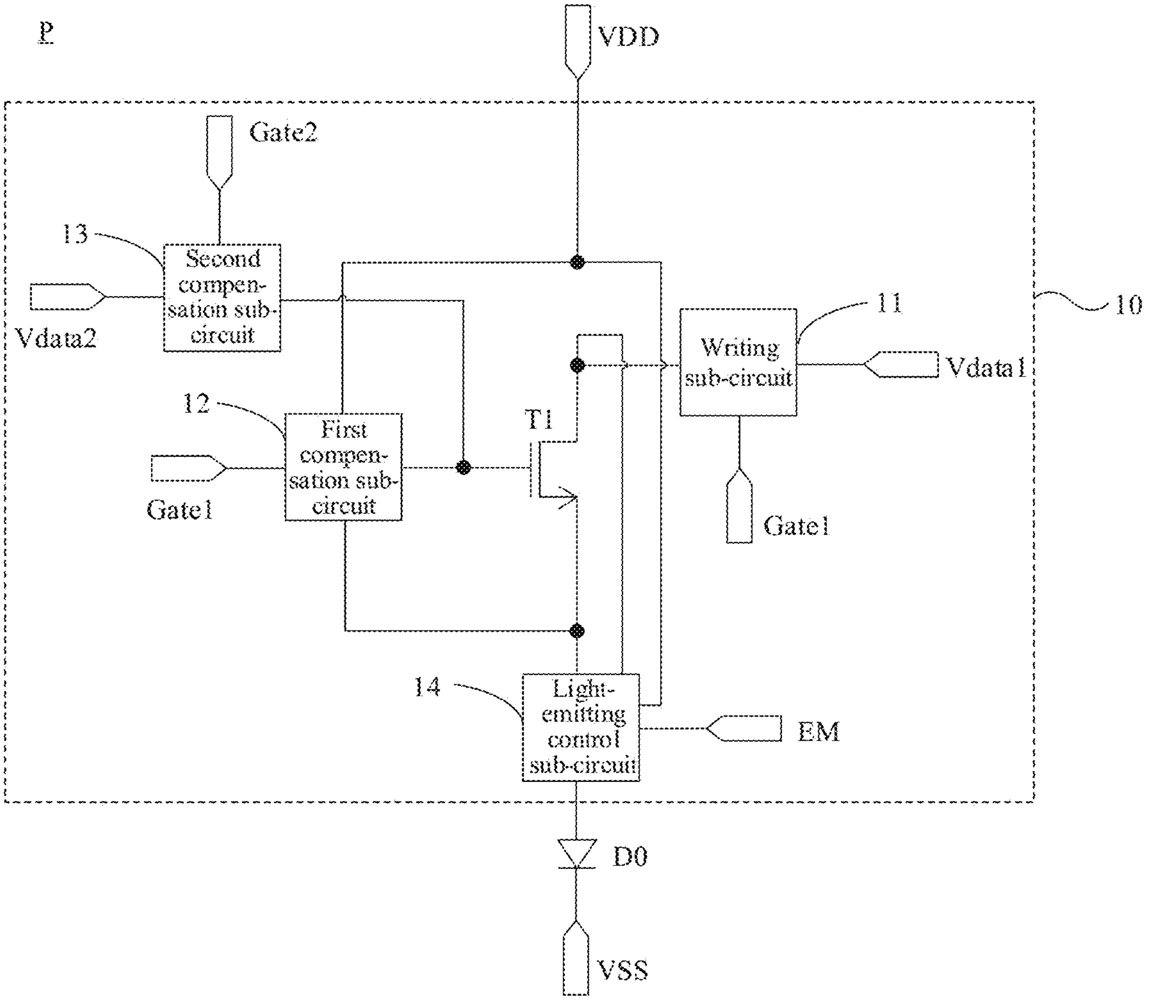
FIG. 8 is a structural diagram of a pixel driving circuit, in accordance with some embodiments.

In view of the above problem, some embodiments of the present disclosure provide a pixel driving circuit 10. As shown in FIG. 8, the pixel driving circuit 10 includes: a first transistor T1, a writing sub-circuit 11, a first compensation sub-circuit 12, a second compensation sub-circuit 13 and a light-emitting control sub-circuit 14.

It will be noted that, for the transistor involved in the embodiments of the present disclosure, the first terminal thereof may be the drain and the second terminal thereof may be the source, or the first terminal thereof may be the source and the second terminal thereof may be the drain, which is not limited thereto. In addition, according to different conduction modes of transistors, the transistors may be classified into enhanced transistors and depletion-mode transistors; according to different substrates required to fabricate transistors, the transistors may be classified into TFTs and metal-oxide-semiconductor field-effect transistors (MOSFETs); and according to types of conduction channels of transistors, the transistors may be classified into P-type transistors and N-type transistors. The embodiments of this disclosure are described by taking an example where the transistors in the pixel driving circuit 10 are enhanced P-type TFTs, and the embodiments of this disclosure do not limit the types of the transistors in the pixel driving circuit 10.

In addition, the TFTs also include LTPS-TFTs and low temperature polycrystalline oxide (LTPO) TFTs. The LTPO-TFTs are TFTs combined with indium gallium zinc oxide (IGZO), which have the advantages of low leakage current and high stability at low refresh rate. In the embodiments of the present disclosure, the transistors in the pixel driving circuit 10 may include at least one LTPO-TFT. For example, the second compensation sub-circuit 13 includes one LTPO-TFT.

With continued reference to FIG. 8, in the pixel driving circuit 10, the writing sub-circuit 11 is coupled to a first control signal terminal, a first data voltage terminal Vdata1 and a first terminal of the first transistor T1; and the writing sub-circuit 11 is configured to write a voltage of the first data voltage terminal Vdata1 into the first terminal of the first transistor T1 in response to a signal of the first control signal terminal.

The first compensation sub-circuit 12 is coupled to the first control signal terminal Gate1, a second terminal of the first transistor T1, a control terminal of the first transistor T1 and a first voltage terminal VDD; and the first compensation sub-circuit 12 is configured to, in response to the signal of the first control signal terminal Gate1, couple a voltage of the second terminal of the first transistor T1 to the control terminal of the first transistor T1 and store a voltage of the control terminal of the first transistor T1.

The second compensation sub-circuit 13 is coupled to a second control signal terminal Gate2, the control terminal of the first transistor T1 and a second data voltage terminal Vdata2; and the second compensation sub-circuit 13 is configured to couple a voltage Vdata2 of the second data voltage terminal Vdata2 to the control terminal of the first transistor T1 in response to a signal of the second control signal terminal Gate2.

The voltage Vdata2 of the second data voltage terminal Vdata2 is determined by the voltage Vdata1 of the first data voltage terminal Vdata1 and a threshold voltage Vth of the first transistor T1 which are within a preset temperature range.

For example, when working within the preset temperature range, each transistor in the pixel driving circuit can work normally, that is, no threshold voltage shift problem occurs. For example, the preset temperature range may be of 10 degrees Celsius to 35 degrees Celsius (e.g., 10 degrees Celsius, 15 degrees Celsius, 20 degrees Celsius, 25 degrees Celsius, 30 degrees Celsius, or 35 degrees Celsius).

For example, the voltage Vdata2 of the second data voltage terminal Vdata2 may be a sum of the voltage Vdata1 of the first data voltage terminal Vdata1 and the threshold voltage Vth of the first transistor T1 within the preset temperature range, and a voltage loss value of the second compensation sub-circuit 13. Considering an example where the second compensation sub-circuit 13 includes one transistor, the voltage loss value of the second compensation sub-circuit 13 may be a threshold voltage of the transistor, and a value of the threshold voltage may be determined through pre-testing. In this way, after the voltage Vdata2 of the second data voltage terminal Vdata2 is input to the control terminal of the first transistor T1, the voltage of the control terminal of the first transistor T1 is equal to a sum of the voltage Vdata1 of the first data voltage terminal Vdata1 and the threshold voltage Vth of the first transistor T1 within the preset temperature range.

In a first possible implementation manner, the voltage Vdata1 of the first data voltage terminal Vdata1 and the threshold voltage Vth of the first transistor T1 within the preset temperature range may be pre-determined and input by the user. For example, the voltage Vdata1 and the first data voltage terminal Vdata1 and the threshold voltage Vth of the first transistor T1 may be obtained by pre-testing voltages of the control terminal, first terminal and second terminal of the first transistor T1 in the pixel driving circuit 10 working within the preset temperature range. Alternatively, the voltage Vdata1 of the first data voltage terminal Vdata1 and the threshold voltage Vth of the first transistor T1 within the preset temperature range may also be obtained by simulating the operation of the pixel driving circuit 10.

In a second possible implementation manner, the voltage Vdata1 of the first data voltage terminal Vdata1 and the threshold voltage Vth of the first transistor T1 within the preset temperature range may also be obtained by the second compensation sub-circuit 13 during the actual operation of the pixel driving circuit 10. The process of obtaining the voltage Vdata1 of the first data voltage terminal Vdata1 and the threshold voltage Vth of the first transistor T1 within the preset temperature range through this implementation manner will be described in the following embodiments.

The light-emitting control sub-circuit 14 is coupled to the first voltage terminal VDD, a third control signal terminal EM, the first terminal of the first transistor T1, the second terminal of the first transistor T1 and an anode of a light-emitting device D0. A cathode of the light-emitting device D0 is coupled to a second voltage terminal VSS. The light-emitting control sub-circuit 14 is configured to be controlled to form a current path between the first voltage terminal VDD and the second voltage terminal VSS in response to a signal of the third control signal terminal EM, so as to drive the light-emitting device D0 to emit light.

The working process of the pixel driving circuit 10 provided in the embodiments of the present disclosure will be schematically described below with reference to FIGS. 8 to 10.

Figure 9:
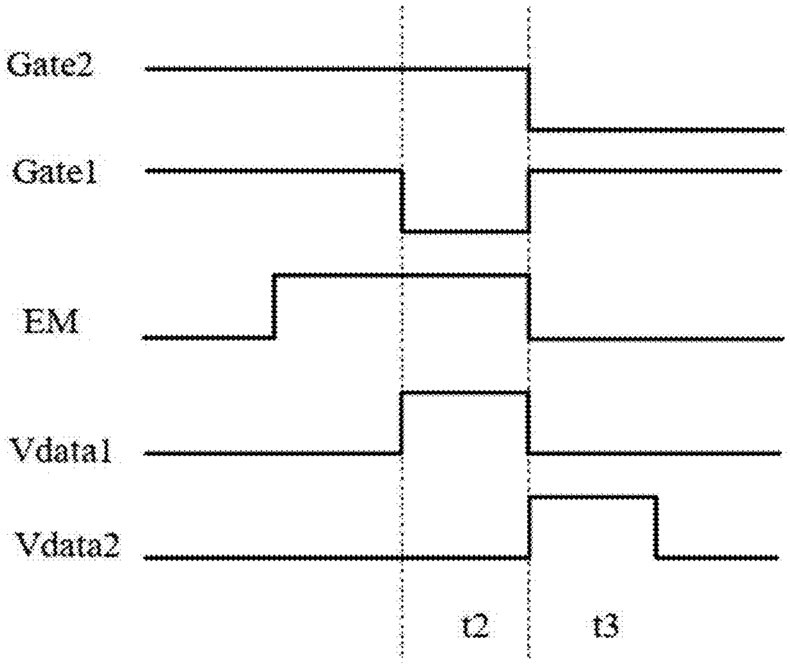
FIG. 9 is a timing diagram of a driving method for a pixel driving circuit, in accordance with some embodiments.
Figure 10:
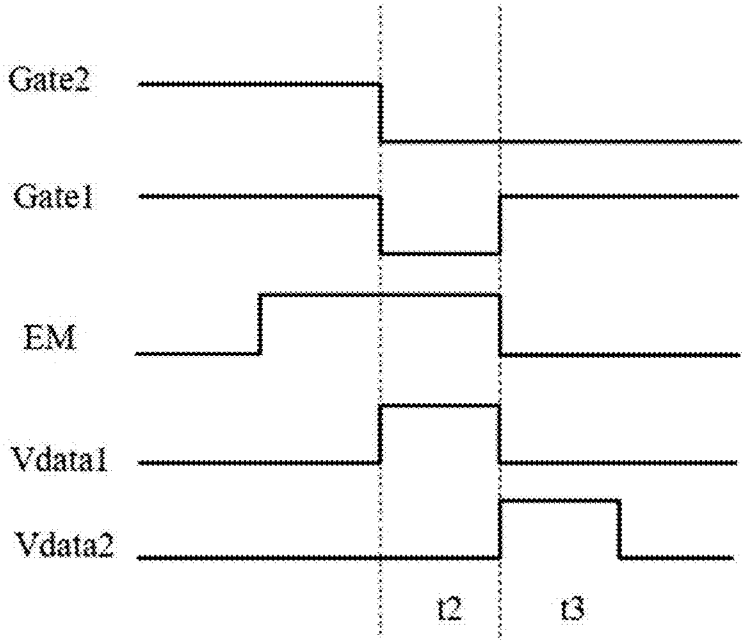
FIG. 10 is a timing diagram of another driving method for a pixel driving circuit, in accordance with some embodiments.

Referring to FIGS. 9 and 10, in some embodiments of the present disclosure, one driving cycle of the pixel driving circuit 10 provided in the embodiments of the present disclosure may include a charging phase (t2) and a light-emitting phase (t3).

Referring to FIGS. 8 and 9, considering the above-mentioned first possible implementation manner as an example, in the charging phase t2, the signal of the first control signal terminal Gate1 is at a low level, and the signal of the second control signal terminal Gate2 and the signal of the third control signal terminal EM are at high levels. In this way, the writing sub-circuit 11 and the first compensation sub-circuit 12 work in response to the signal of the first control signal terminal Gate1. The writing sub-circuit 11 works and can control the voltage of the first data voltage terminal Vdata1 to be written into the first terminal of the first transistor T1. The first compensation sub-circuit 12 works and can control the first transistor T1 to be presented as a diode structure, so that the voltage of the first data voltage terminal Vdata1 passes through the first transistor T1 and is coupled to the control terminal of the first transistor T1. At this time, the control terminal of the first transistor T1 continues to be charged (that is, the voltage continues to be written into the control terminal of the first transistor T1) until the first transistor T1 is turned off. When the first transistor T1 is turned off, the voltage of its control terminal can be expressed as the sum of the voltage Vdata1 of the first data voltage terminal Vdata1 and the threshold voltage Vth of the first transistor T1 (i.e., Vdata1+Vth). In addition, the first compensation sub-circuit 12 works and can also store the voltage coupled to the control terminal of the first transistor T1.

In the light-emitting phase, the signal of the second control signal terminal Gate2 and the signal of the third control signal terminal EM are at low levels, and the signal of the first control signal terminal Gate1 is at a high level. In this way, in response to the signal of the second control signal terminal Gate2, the second compensation sub-circuit 13 works and can control the voltage Vdata2 of the second data voltage terminal Vdata2 to be written into the control terminal of the first transistor T1. In this case, the voltage of the control terminal of the first transistor T1 is equal to Vdata1+Vth. In addition, the light-emitting control sub-circuit 14 works in response to the signal of the third control signal terminal EM, so that the current path is formed between the first voltage terminal VDD and the second voltage terminal VSS, and the light-emitting device D0 is driven to emit light.

In this case, the driving current I at the anode of the light-emitting device D0 (equal to the current flowing through the first transistor T1) may be expressed by the following formula (2):

$$I = K(Vdata2 - VDD - Vth)^2 = K(Vdata1 - Vth)^2 \quad (2)$$

As for the meaning of K, reference can be made to the above embodiments. Vdata1 is the voltage Vdata1 of the first data voltage terminal Vdata1 within the preset temperature range, which is a fixed value.

In the above-mentioned first possible implementation manner, the second compensation sub-circuit 13 only works in the light-emitting phase.

Referring to FIGS. 8 and 10, considering the above second possible implementation manner as an example, in the charging phase and the light-emitting phase, the signal of the second control signal terminal Gate2 is at a low level. That is, the second compensation sub-circuit 13 works in both the charging phase and the light-emitting phase. In this way, in the charging phase, the second compensation sub-circuit 13 can write the voltage (Vdata1+Vth) of the control terminal of the first transistor T1 into the second data voltage terminal Vdata2 in response to the signal of the second control signal terminal Gate2, so that the voltage Vdata1 of the first data voltage terminal Vdata1 and the threshold voltage Vth of the first transistor T1 within the preset temperature range are determined. In the light-emitting phase, the second compensation sub-circuit 13 can control the voltage Vdata2 of the second data voltage terminal Vdata2 to be written into the control terminal of the first transistor T1 in response to the signal of the second control signal terminal Gate2.

In the pixel driving circuit 10 provided in the embodiments of the present disclosure, the control terminal of the first transistor T1 in the pixel driving circuit 10 is coupled to the second compensation sub-circuit 13, so that the writing sub-circuit 11 writes the voltage of the first data voltage terminal Vdata1 into the first terminal of the first transistor T1. After the first compensation sub-circuit 12 compensates the voltage of the first data voltage terminal Vdata1 and the threshold voltage Vth of the first transistor T1 to the control terminal of the first transistor T1, the voltage of the second data voltage terminal Vdata2 can be compensated to the control terminal of the first transistor T1 by the provided second compensation sub-circuit 13. The voltage of the second data voltage terminal Vdata2 is determined by the voltage of the first data voltage terminal Vdata1 and the threshold voltage Vth of the first transistor T1 within the preset temperature range, so that a data voltage of the control terminal of the first transistor T1 (driving transistor) is stable at the voltage Vdata1 of the first data voltage terminal Vdata1 within the preset temperature range. Therefore, the stability of the driving current I output by the first transistor T1 to the light-emitting device D0 is maintained, which ensures the display effect of the OLED display apparatus working at a high temperature.

A structure of each sub-circuit in the pixel driving circuit 10 will be schematically described below with reference to FIG. 11.

Figure 11:
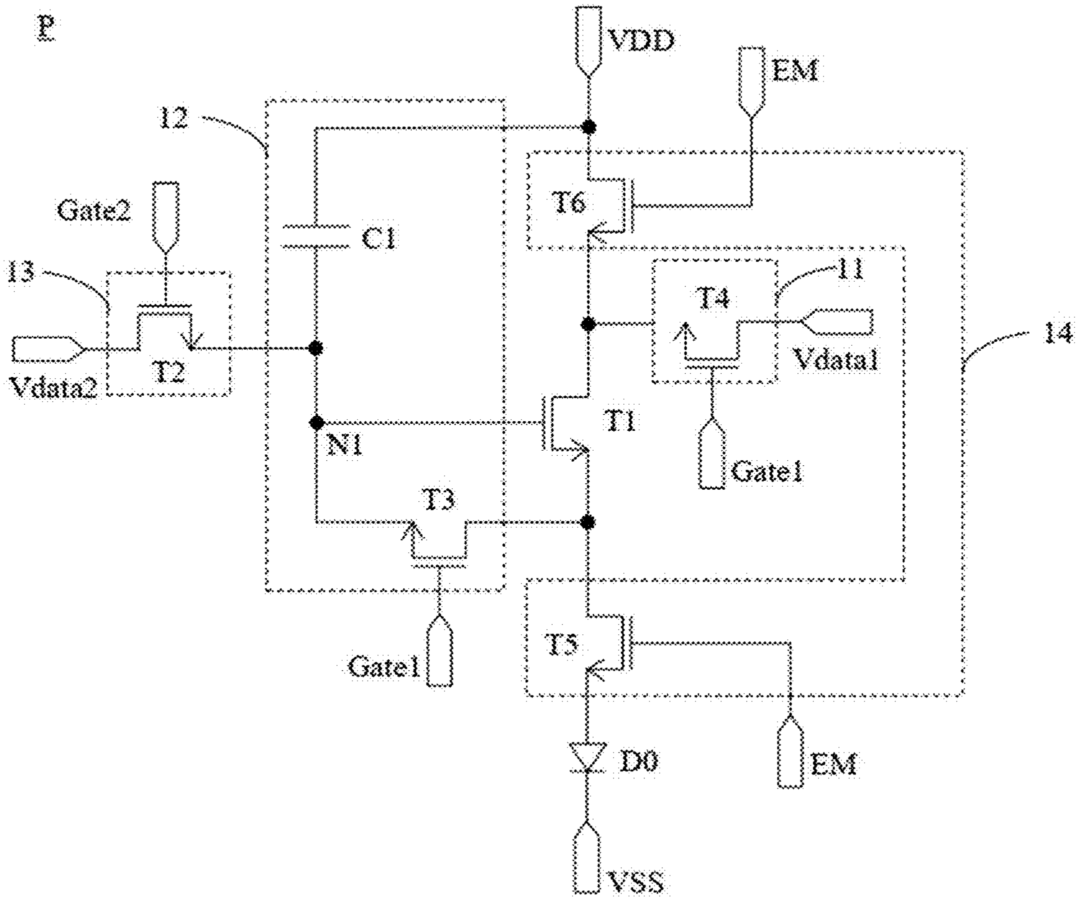
FIG. 11 is a structural diagram of another pixel driving circuit, in accordance with some embodiments.

As shown in FIG. 11, in some embodiments, the second compensation sub-circuit 13 in the pixel driving circuit 10 includes a second transistor T2. A control terminal of the second transistor T2 is coupled to the second scan signal terminal GATE2, a first terminal of the second transistor T2 is coupled to the second data voltage terminal Vdata2, and a second terminal of the second transistor T2 is coupled to the control terminal of the first transistor T1.

Considering the above-mentioned first possible implementation manner as an example, referring to FIG. 9, in the light-emitting phase, the signal of the second control signal terminal Gate2 and the signal of the third control signal terminal EM are at low levels, and the signal of the first control signal terminal Gate1 is at a high level. In this way, the second transistor T2 is turned on in response to the signal of the second control signal terminal Gate2. Therefore, the voltage Vdata2 of the second data voltage terminal Vdata2 can be written into the control terminal of the first transistor T1 through the second transistor T2. In this case, the voltage of the control terminal of the first transistor T1 is Vdata1+Vth.

Considering the above-mentioned second possible implementation manner as an example, referring to FIG. 10, in the charging phase and the light-emitting phase, the signal of the second control signal terminal Gate2 is at a low level. That is, the second transistor T2 is turned on in both the charging phase and the light-emitting phase. In this way, in the charging phase, the second transistor T2 can write the voltage (Vdata1+Vth) of the control terminal of the first transistor T1 into the second data voltage terminal Vdata2 in response to the signal of the second control signal terminal Gate2. Therefore, the voltage Vdata1 of the first data voltage terminal Vdata1 and the threshold voltage Vth of the first transistor T1 within the preset temperature range are determined.

In some embodiments, the first compensation sub-circuit 12 includes a third transistor T3 and a first capacitor C1. A control terminal of the third transistor T3 is coupled to the first control signal terminal Gate1, a first terminal of the third transistor T3 is coupled to the second terminal of the first transistor T1, and a second terminal of the third transistor T3 is coupled to the control terminal of the first transistor T1 and a first terminal of the first capacitor C1. A second terminal of the first capacitor C1 is coupled to the first voltage terminal VDD.

The third transistor T3 is configured to be turned on in response to the signal of the second control signal terminal Gate2, so that the voltage of the second terminal of the first transistor T1 is coupled to the control terminal of the first transistor T1. The first capacitor C1 is configured to store the voltage of the control terminal of the first transistor T1.

In this embodiment, in the charging phase, the signal of the first control signal terminal Gate1 is at a low level, and the signal of the second control signal terminal Gate2 and the signal of the third control signal terminal EM are at high levels. In this way, in response to the signal of the first control signal terminal Gate1, the writing sub-circuit 11 and the first capacitor C1 work, and the third transistor T3 is turned on. The writing sub-circuit 11 works and can control the voltage of the first data voltage terminal Vdata1 to be written into the first terminal of the first transistor T1. The third transistor T3 is turned on and can control the first transistor T1 to be presented as a diode structure, so that the voltage of the first data voltage terminal Vdata1 passes through the first transistor T1 and is coupled to the control terminal of the first transistor T1. In this case, the control terminal of the first transistor T1 continues to be charged until the first transistor T1 is turned off. When the first transistor T1 is turned off, the voltage of its control terminal can be expressed as the sum of the voltage Vdata1 of the first data voltage terminal Vdata1 and the threshold voltage Vth of the first transistor T1 (i.e., Vdata1+Vth). In addition, the first capacitor C1 can store the voltage coupled to the control terminal of the first transistor T1.

In some embodiments, the writing sub-circuit 11 includes a fourth transistor T4. A control terminal of the fourth transistor T4 is coupled to the first control signal terminal Gate1, a first terminal of the fourth transistor T4 is coupled to the first data voltage terminal Vdata1, and a second terminal of the fourth transistor T4 is coupled to the first terminal of the first transistor T1.

In this embodiment, in the charging phase, the signal of the first control signal terminal Gate1 is at a low level, the signal of the second control signal terminal Gate2 and the signal of the third control signal terminal EM are at high levels. In this way, in response to the signal of the first control signal terminal Gate1, the fourth transistor T4 is turned on and controls the voltage of the first data voltage terminal Vdata1 to be written into the first terminal of the first transistor T1.

In some embodiments, the light-emitting control sub-circuit 14 includes a fifth transistor T5 and a sixth transistor T6. A control terminal of the fifth transistor T5 is coupled to the third control signal terminal EM, a first terminal of the fifth transistor T5 is coupled to the second terminal of the first transistor T1, and a second terminal of the fifth transistor T5 is coupled to the anode of the light-emitting device D0. A control terminal of the sixth transistor T6 is coupled to the third control signal terminal EM, a first terminal of the sixth transistor T6 is coupled to the first voltage terminal VDD, and a second terminal of the sixth transistor T6 is coupled to the first terminal of the first transistor T1.

In this embodiment, in the light-emitting phase, the signal of the second control signal terminal Gate2 and the signal of the third control signal terminal EM are at low levels, and the signal of the first control signal terminal Gate1 is at a high level. In this way, the fifth transistor T5 and the sixth transistor T6 are turned on in response to the signal of the third control signal terminal EM, so that the current path is formed between the first voltage terminal VDD and the second voltage terminal VSS, and the light-emitting device D0 is driven to emit light.

Figure 12:
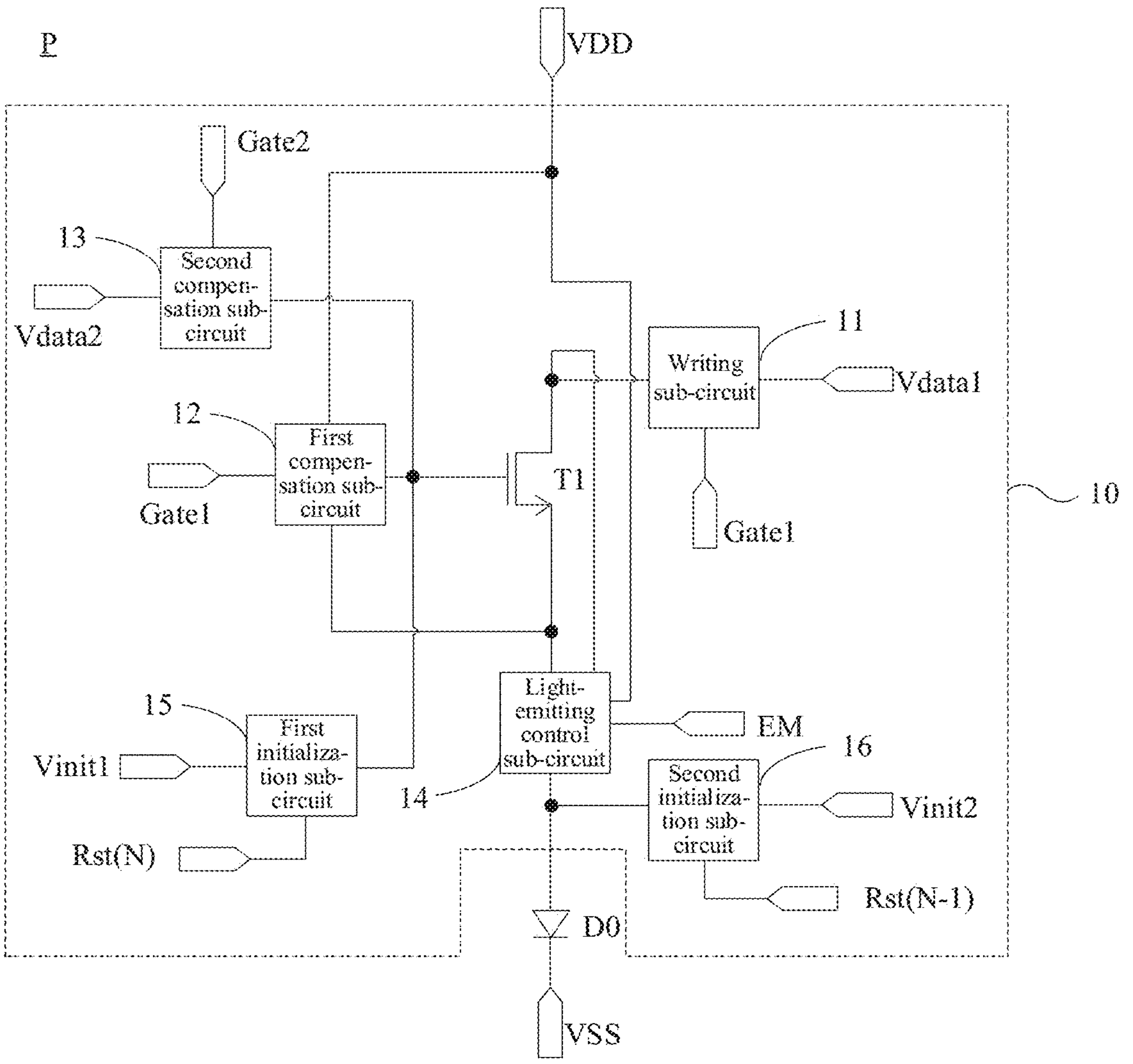
FIG. 12 is a structural diagram of yet another pixel driving circuit, in accordance with some embodiments.

In some embodiments, as shown in FIG. 12, the pixel driving circuit 10 further includes a first initialization sub-circuit 15 and a second initialization sub-circuit 16.

The first initialization sub-circuit 15 is coupled to a fourth control signal terminal Rst(N), a first reset voltage terminal Vinit1 and the control terminal of the first transistor T1, and is configured to transmit a voltage of the first reset voltage terminal Vinit1 as a reset voltage to the control terminal of the first transistor T1 in response to a single of the fourth control signal terminal Rst(N).

The second initialization sub-circuit 16 is coupled to a fifth control signal terminal Rst(N−1), a second reset voltage terminal Vinit2 and the anode of the light-emitting device D0, and is configured to transmit a voltage of the second reset voltage terminal Vinit2 as the reset voltage to the anode of the light-emitting device D0 in response to a signal of the fifth control signal terminal Rst(N−1).

In combination with FIG. 12 and with reference to FIGS. 13 and 14, the working process of the pixel driving circuit 10 including the first initialization sub-circuit 15 and the second initialization sub-circuit 16 will be schematically described below.

Figure 13:
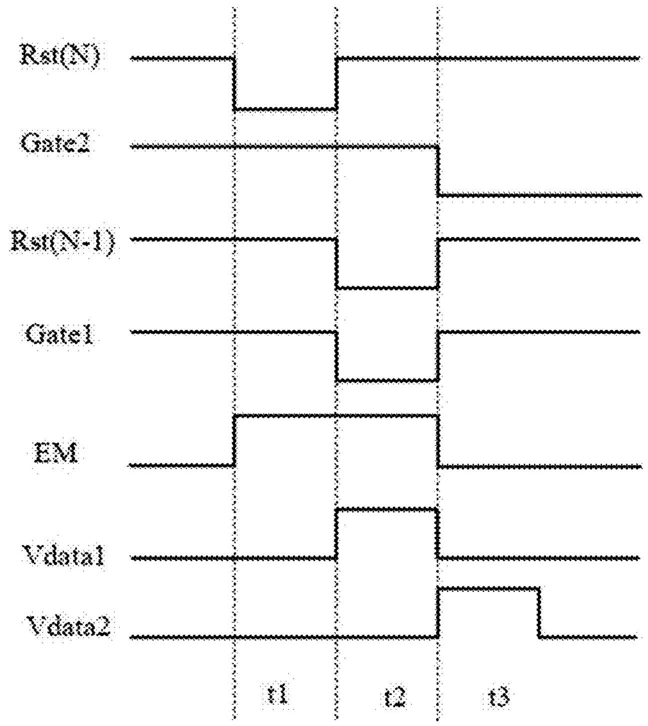
FIG. 13 is a timing diagram of yet another driving method for a pixel driving circuit, in accordance with some embodiments.
Figure 14:
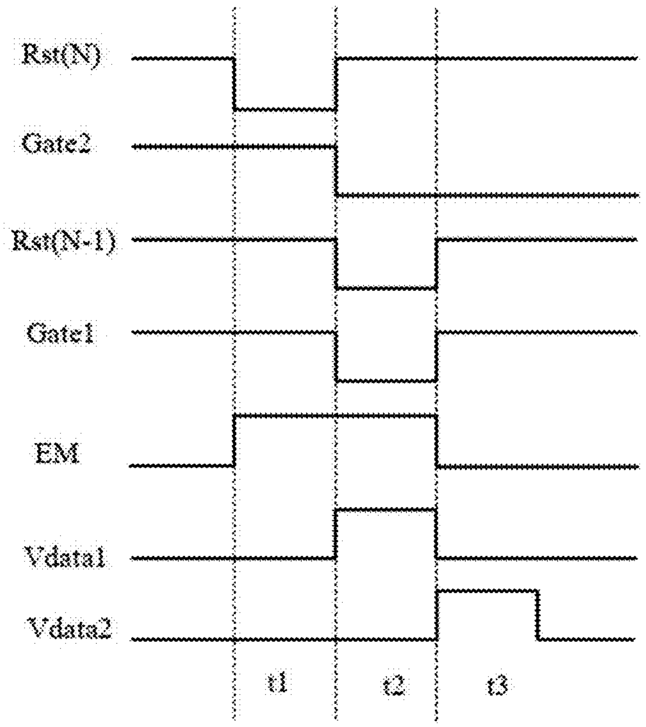
FIG. 14 is a timing diagram of yet another driving method for a pixel driving circuit, in accordance with some embodiments.

Referring to FIGS. 13 and 14, in a refresh phase, the signal of the fourth control signal terminal Rst(N) is at a low level, and signals of other control terminals are each at a high level. In this way, the first initialization sub-circuit 15 works in response to the signal of the fourth control signal terminal Rst(N), and the voltage of the first reset voltage terminal Vinit1 is transmitted to the control terminal of the first transistor T1 as the reset voltage, so that the control terminal of the first transistor T1 is reset to prepare for the voltage writing of the control terminal of the first transistor T1 in the charging phase.

In the charging phase, the signal of the fifth control signal terminal Rst(N−1) is at a low level, and the signal of the fourth control signal terminal Rst(N) is at a high level. As for levels of the signals of other signal terminals, reference can be made to the description in the above embodiments, and details will not be repeated here. In this way, the second initialization sub-circuit 16 works in response to the signal of the fifth control signal terminal Rst(N−1), and the voltage of the second reset voltage terminal Vinit2 is transmitted to the anode of the light-emitting device D0 as the reset voltage, so that the anode of the light-emitting device D0 is reset to eliminate influence of residual potential in a previous driving cycle on the light-emitting device D0.

In the light-emitting phase, the signal of the fourth control signal terminal Rst(N) and the signal of the fifth control signal terminal Rst(N−1) are each at a high level. As for the levels of the signals of other signal terminals, reference can be made to the description in the above embodiments, and details will not be repeated here.

Figure 15:
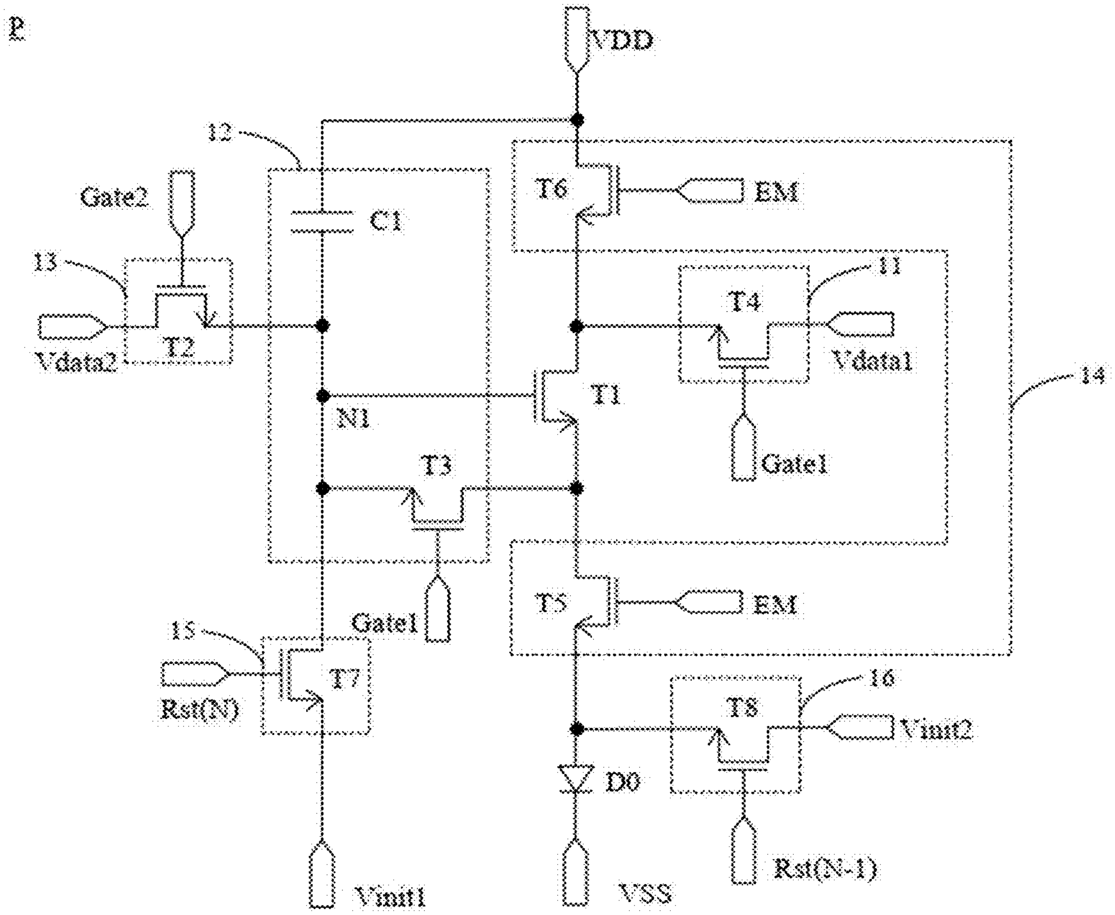
FIG. 15 is a structural diagram of yet another pixel driving circuit, in accordance with some embodiments.

Referring to FIG. 15, for example, the first initialization sub-circuit 15 may include a seventh transistor T7. A control terminal of the seventh transistor T7 is coupled to the fourth control signal terminal Rst(N), a first terminal of the seventh transistor T7 is coupled to the first reset voltage terminal Vinit1, and a second terminal of the seventh transistor T7 is coupled to the control terminal of the first transistor T1. For example, the second initialization sub-circuit 16 may include an eighth transistor T8. A control terminal of the eighth transistor T8 is coupled to the fifth control signal terminal Rst(N−1), a first terminal of the eighth transistor T8 is coupled to the second reset voltage terminal Vinit2, and a second electrode of the eighth transistor T8 is coupled to the anode of the light-emitting device D0.

In the case where the pixel driving circuit 10 includes the first transistor T1, the writing sub-circuit 11, the first compensation sub-circuit 12, the second compensation sub-circuit 13, the light-emitting control sub-circuit 14, the first initialization sub-circuit 15 and the second initialization sub-circuit, the pixel driving circuit 10 may include the first transistor T1, the second transistor T2, the third transistor T3, the fourth transistor T4, the fifth transistor T5, the sixth transistor T6, the seventh transistor T7, the eighth transistor T8 and the first capacitor C1 as shown in FIG. 15. In this case, the pixel driving circuit 10 is of an "8T1C" structure.

Figure 16:
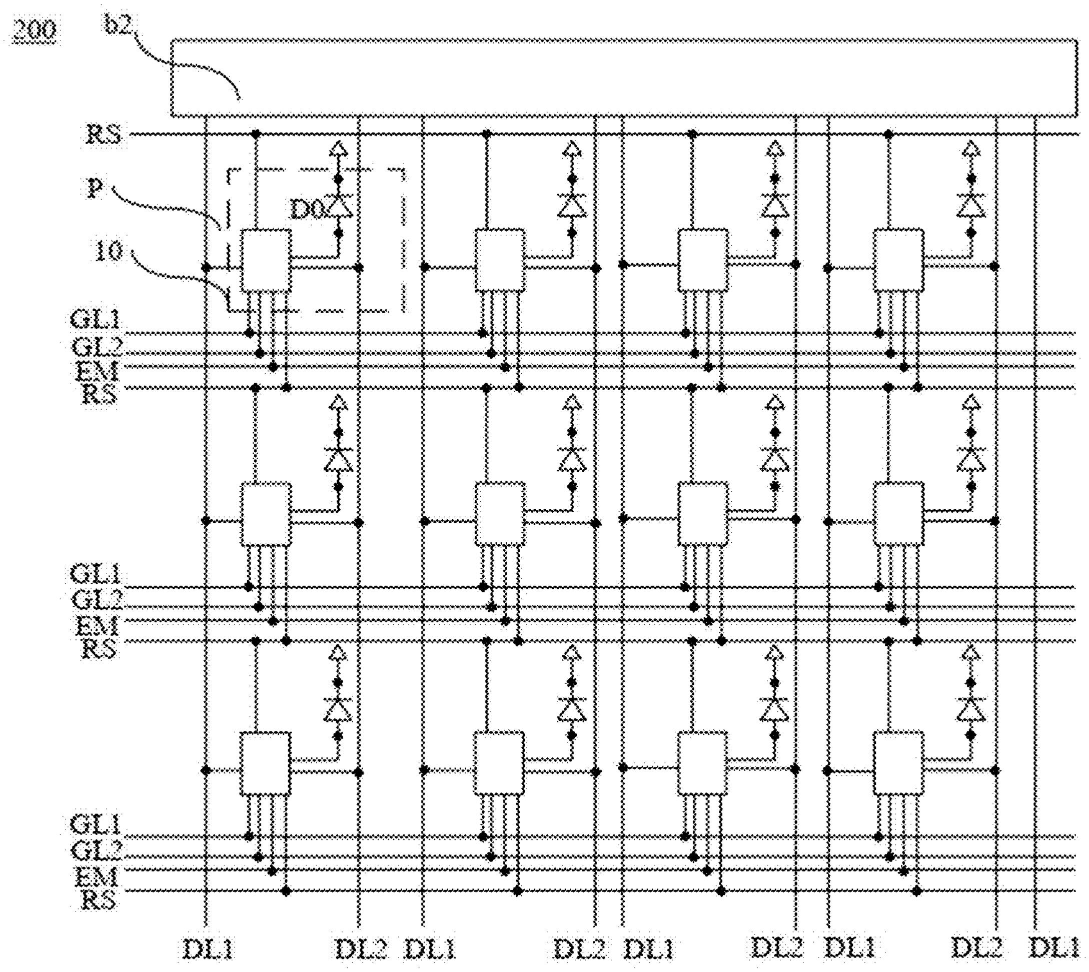
FIG. 16 is a structural diagram of yet another display panel, in accordance with some embodiments.

As shown in FIG. 16, some embodiments of the present disclosure provide a display panel 200. The display panel 200 includes a plurality of sub-pixels P, and each sub-pixel P includes a light-emitting device D0 and the pixel driving circuit 10 as described in any one of the above embodiments.

For example, referring to FIG. 16, the same row of sub-pixels P may be connected to a gate line GL1, a gate line GL2, a light-emitting control signal line EM, and reset scan signal line(s) RS. The same column of sub-pixels P may be connected to a data line DL1 and a data line DL2. The gate line GL1, the gate line GL2 and the reset scan signal line(s) RS are all connected to the scan driver b3 in FIG. 5, the light-emitting control signal line EM is connected to the light-emitting driver b4 in FIG. 5, and the data line DL1 and the data line DL2 are both connected to the D-IC b2.

Each sub-pixel P is provided therein with a pixel driving circuit 10 for controlling a light-emitting device D0 in the sub-pixel P to emit light. A gate line GL1 connected to the sub-pixel P is configured to transmit a signal of a first control signal terminal Gate1 to the pixel driving circuit 10 in the sub-pixel P. A gate line GL2 connected to the sub-pixel P is configured to transmit a signal of a second control signal terminal Gate2 to the pixel driving circuit 10 in the sub-pixel P. Reset scan signal lines RS connected to the sub-pixel P are configured to transmit a signal of a fourth control signal terminal Rst(N) and a signal of a fifth control signal terminal Rst(N−1) to the pixel driving circuit 10 in the sub-pixel P. A light-emitting control signal line EM connected to the sub-pixel P is configured to transmit a signal of a third control signal terminal EM to the pixel driving circuit 10 in the sub-pixel P. A data line DL1 connected to the sub-pixel P is configured to transmit a voltage of a first data voltage terminal Vdata1 to the pixel driving circuit 10 in the sub-pixel P. A data line DL2 connected to the sub-pixel P is configured to transmit a voltage of a second data voltage terminal Vdata2 to the pixel driving circuit 10 in the sub-pixel P.

It should be understood that FIG. 16 is only an exemplary illustration by taking the plurality of sub-pixels P in a standard RGB arrangement as an example, and the embodiments of the present disclosure do not limit the arrangement of the plurality of sub-pixels P in the display panel 200. For example, the plurality of sub-pixels P are arranged in various arrangements such as PenTile arrangement, Delta arrangement, RGBW arrangement, etc.

Figure 17:
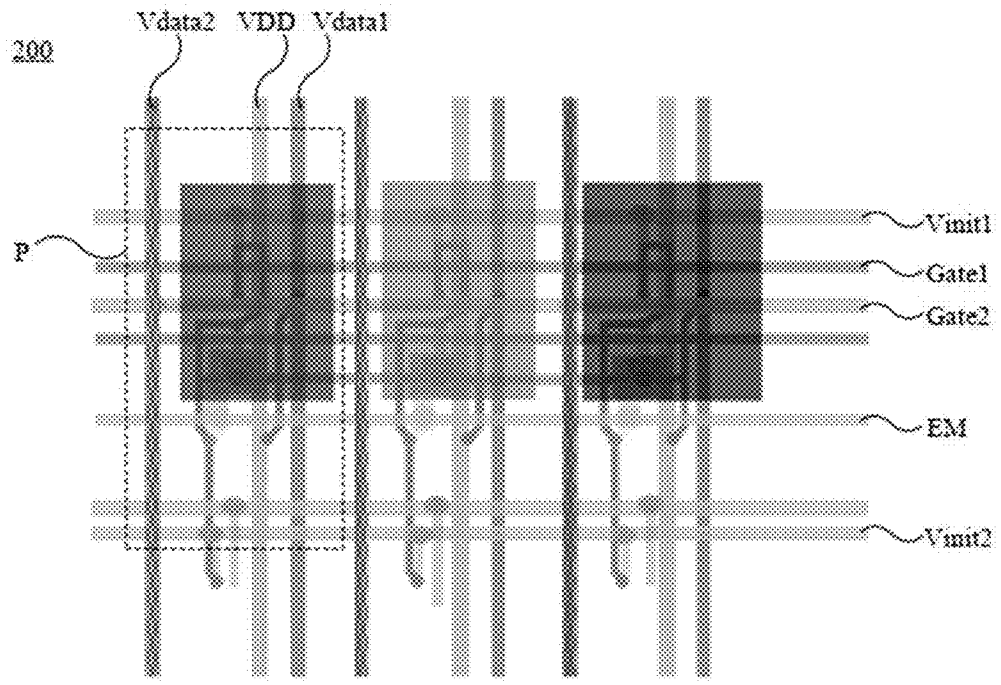
FIG. 17 is a layout design diagram of a display panel, in accordance with some embodiments.

Considering the plurality of sub-pixels P in the display panel 200 in a standard RGB arrangement as an example, the layout of the display panel 200 can be shown in FIG. 17.

Beneficial effects achieved by the display panel 200 provided in some embodiments of the present disclosure include at least the same beneficial effects achieved by the display substrate provided by some embodiments above, which will not be repeated here.

In addition, some embodiments of the present disclosure further provide a display apparatus. The display apparatus includes a flexible printed circuit board and the display panel 200 as described in any one of the above embodiments. The flexible printed circuit board is electrically connected to the display panel.

Beneficial effects achieved by the display apparatus provided in some embodiments of the present disclosure include at least the same beneficial effects achieved by the pixel driving circuit 10 provided in some embodiments, and details will not be repeated here.

Figure 18:
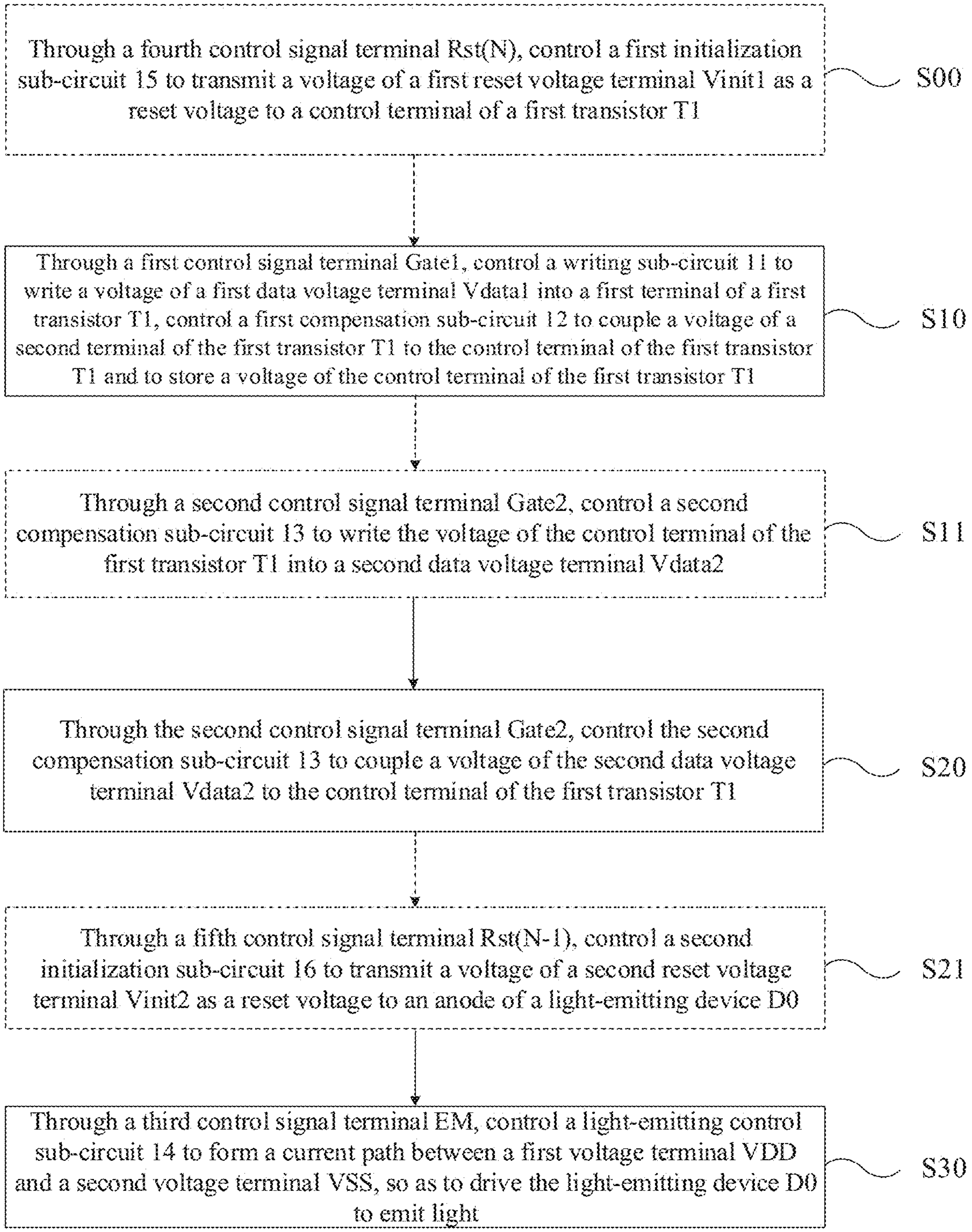
FIG. 18 is a flow diagram of a driving method for a pixel driving circuit, in accordance with some embodiments.

In addition, as shown in FIG. 18, some embodiments of the present disclosure provide a driving method for a pixel driving circuit, which is applied to the pixel driving circuit 10 as described in any of the above embodiments. An execution subject of the method may be the D-IC in FIG. 5 in the above-mentioned embodiments, or may be any unit with a processing capability in the display apparatus provided in the embodiments of the present disclosure. In the following embodiments, the driving method for the pixel driving circuit is exemplarily described by taking an example where the D-IC is the execution subject. It should be understood that as for the manner of controlling the operation of each sub-circuit in the pixel driving circuit 10 by changing levels of signals of different control signal terminals, reference can be made to the foregoing embodiments, and details will not be repeated here.

A driving cycle of the driving method for the pixel driving circuit includes: a charging phase and a light-emitting phase. The driving method for the pixel driving circuit includes as follows.

In the charging stage:

in S10, through the first control signal terminal Gate1, the writing sub-circuit 11 is controlled to write the voltage of the first data voltage terminal Vdata1 into the first terminal of the first transistor T1, and the first compensation sub-circuit 12 is controlled to couple the voltage of the second terminal of the first transistor T1 to the control terminal of the first transistor T1 and store the voltage of the control terminal of the first transistor T1.

In the light-emitting phase:

in S20, through the second control signal terminal Gate2, the second compensation sub-circuit 13 is controlled to couple the voltage of the second data voltage terminal Vdata2 to the control terminal of the first transistor T1;

in S30, through the third control signal terminal EM, the light-emitting control sub-circuit 14 is controlled to form a current path between the first voltage terminal VDD and the second voltage terminal VSS to drive the light-emitting device D0 to emit light.

In some embodiments, the driving method for the pixel driving circuit further includes as follows.

In the charging stage:

in S11, through the second control signal terminal Gate2, the second compensation sub-circuit 13 is controlled to write the voltage of the control terminal of the first transistor T1 into the second data voltage terminal Vdata2.

The voltage of the second data voltage terminal Vdata2 is determined by the voltage of the first data voltage terminal Vdata1 and the threshold voltage of the first transistor T1 within the preset temperature range.

Considering the first possible implementation manner mentioned above as an example, the voltage of the second data voltage terminal Vdata2 may be directly input into the D-IC by the user, or it may be determined by the D-IC after the voltage of the first data voltage terminal Vdata1 and the threshold voltage of the first transistor T1 within the preset temperature range are input into the by the user.

Considering the second possible implementation manner mentioned above as an example, the voltage of the second data voltage terminal Vdata2 may be determined by the D-IC after reading the voltage of the first data voltage terminal Vdata1 and the threshold voltage of the first transistor T1 within the preset temperature range through the second compensation sub-circuit 13.

In some embodiments, referring to FIG. 12, the pixel driving circuit 10 further includes: a first initialization sub-circuit 15 and a second initialization sub-circuit 16. The first initialization sub-circuit 15 is coupled to a fourth control signal terminal Rst(N), a first reset voltage terminal Vinit1 and the control terminal of the first transistor T1. The second initialization sub-circuit 16 is coupled to a fifth control signal terminal Rst(N−1), a second reset voltage terminal Vinit2 and the anode of the light-emitting device D0. In this case, a driving cycle of the driving method for the pixel driving circuit further includes: a refresh phase. The method further includes as follows.

In the refresh phase:

in S00, through the fourth control signal terminal Rst(N), the first initialization sub-circuit 15 is controlled to transmit a voltage of the first reset voltage terminal Vinit1 as a reset voltage to the control terminal of the first transistor T1.

In the charging phase:

in S21, through the fifth control signal terminal Rst(N−1), the second initialization sub-circuit 16 is controlled to transmit a voltage of the second reset voltage terminal Vinit2 as the reset voltage to the anode of the light-emitting device D0.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the scope of the present disclosure shall be subject to the protection scope of the claims.

What is claimed is:

1. A pixel driving circuit, comprising: a first transistor, a writing sub-circuit, a first compensation sub-circuit, a second compensation sub-circuit and a light-emitting control sub-circuit, wherein the writing sub-circuit is coupled to a first control signal terminal, a first data voltage terminal and a first terminal of the first transistor, and is configured to write a voltage of the first data voltage terminal into the first terminal of the first transistor in response to a signal of the first control signal terminal;

the first compensation sub-circuit is coupled to the first control signal terminal, a second terminal of the first transistor, a control terminal of the first transistor and a first voltage terminal, and is configured to couple a voltage of the second terminal of the first transistor to the control terminal of the first transistor and store a voltage of the control terminal of the first transistor in response to the signal of the first control signal terminal;

the second compensation sub-circuit is coupled to a second control signal terminal, the control terminal of the first transistor and a second data voltage terminal, and is configured to couple a voltage of the second data voltage terminal to the control terminal of the first transistor in response to a signal of the second control signal terminal; the voltage of the second data voltage terminal is determined by the voltage of the first data voltage terminal and a threshold voltage of the first transistor within a preset temperature range;

the light-emitting control sub-circuit is coupled to the first voltage terminal, a third control signal terminal, the first terminal of the first transistor, the second terminal of the first transistor and an anode of a light-emitting device; a cathode of the light-emitting device is coupled to a second voltage terminal; and the light-emitting control sub-circuit is configured to be controlled to form a current path between the first voltage terminal and the second voltage terminal in response to a signal of the third control signal terminal, so as to drive the light-emitting device to emit light.

2. The pixel driving circuit according to claim 1, wherein the second compensation sub-circuit is further configured to write the voltage of the control terminal of the first transistor into the second data voltage terminal in response to the signal of second control signal terminal.

3. The pixel driving circuit according to claim 1, wherein the second compensation sub-circuit includes a second transistor, a control terminal of the second transistor is coupled to the second control signal terminal, a first terminal of the second transistor is coupled to the second data voltage terminal, and a second terminal of the second transistor is coupled to the control terminal of the first transistor.

4. The pixel driving circuit according to claim 1, wherein the first compensation sub-circuit includes a third transistor and a first transistor; a control terminal of the third transistor is coupled to the first control signal terminal, a first terminal of the third transistor is coupled to the second terminal of the first transistor, and a second terminal of the third transistor is coupled to the control terminal of the first transistor and a first terminal of the first capacitor; a second terminal of the first capacitor is coupled to the first voltage terminal;

the third transistor is configured to be turned on in response to the signal of the second control signal terminal such that the voltage of the second terminal of the first transistor is coupled to the control terminal of the first transistor; and the first capacitor is configured to store the voltage of the control terminal of the first transistor.

5. The pixel driving circuit according to claim 1, wherein the writing sub-circuit includes a fourth transistor, a control terminal of the fourth transistor is coupled to the first control signal terminal, a first terminal of the fourth transistor is coupled to the first data voltage terminal, and a second terminal of the fourth transistor is coupled to the first terminal of the first transistor.

6. The pixel driving circuit according to claim 1, wherein the light-emitting control sub-circuit includes a fifth transistor and a sixth transistor; a control terminal of the fifth transistor is coupled to the third control signal terminal, a first terminal of the fifth transistor is coupled to the second terminal of the first transistor, and a second terminal of the fifth transistor is coupled to the anode of the light-emitting device; and a control terminal of the sixth transistor is coupled to the third control signal terminal, a first terminal of the sixth transistor is coupled to the first voltage terminal, and a second terminal of the sixth transistor is coupled to the first terminal of the first transistor.

7. The pixel driving circuit according to claim 1, further comprising a first initialization sub-circuit and a second initialization sub-circuit, wherein the first initialization sub-circuit is coupled to a fourth control signal terminal, a first reset voltage terminal and the control terminal of the first transistor, and is configured to transmit a voltage of the first reset voltage terminal as a reset voltage to the control terminal of the first transistor in response to a signal of the fourth control signal terminal; and the second initialization sub-circuit is coupled to a fifth control signal terminal, a second reset voltage terminal and the anode of the light-emitting device, and is configured to transmit a voltage of the second reset voltage terminal as a reset voltage to the anode of the light-emitting device in response to a signal of the fifth control signal terminal.

8. A display panel, characterized by comprising a plurality of sub-pixels, each sub-pixel including the light-emitting device and the pixel driving circuit according to claim 1.

9. The display panel according to claim 8, wherein the second compensation sub-circuit is further configured to write the voltage of the control terminal of the first transistor into the second data voltage terminal in response to the signal of second control signal terminal.

10. The display panel according to claim 8, wherein the second compensation sub-circuit includes a second transistor, a control terminal of the second transistor is coupled to the second control signal terminal, a first terminal of the second transistor is coupled to the second data voltage terminal, and a second terminal of the second transistor is coupled to the control terminal of the first transistor.

11. A display apparatus, comprising a flexible printed circuit board and the display panel according to claim 8, the flexible printed circuit board being electrically connected to the display panel.

12. A driving method for a pixel driving circuit, applied to the pixel driving circuit according to claim 1, wherein a driving cycle of the driving method for the pixel driving circuit includes a charging phase and a light-emitting phase; the method comprising:

in the charging phase, through the first control signal terminal, controlling the writing sub-circuit to write the voltage of the first data voltage terminal into the first terminal of the first transistor; and controlling the first compensation sub-circuit to couple the voltage of the second terminal of the first transistor to the control terminal of the first terminal and to store the voltage of the control terminal of the first transistor; and in the light-emitting phase, through the second control signal terminal, controlling the second compensation sub-circuit to couple the voltage of the second data voltage terminal to the control terminal of the first transistor; and through the third control signal terminal, controlling the light-emitting control sub-circuit to form the current path between the first voltage terminal and the second voltage terminal to drive the light-emitting device to emit light.

13. The method according to claim 12, further comprising:

in the charging phase, through the second control signal terminal, controlling the second compensation sub-circuit to write the voltage of the control terminal of the first transistor into the second data voltage terminal;

wherein the voltage of the second data voltage terminal is determined by the voltage of the first data voltage terminal and a threshold voltage of the first transistor within a preset temperature range.

14. The method according to claim 12, wherein the pixel driving circuit further includes: a first initialization sub-circuit and a second initialization sub-circuit; the first initialization sub-circuit is coupled to a fourth control signal terminal, a first reset voltage terminal and the control terminal of the first transistor; the second initialization sub-circuit is coupled to a fifth control signal terminal, a second reset voltage terminal and the anode of the light-emitting device; the driving cycle of the driving method for the pixel driving circuit further includes a refresh phase; and the method further comprises:

in the refresh phase, through the fourth control signal terminal, controlling the first initialization sub-circuit to transmit a voltage of the first reset voltage terminal as a reset voltage to the control terminal of the first transistor; and in the charging phase, through the fifth control signal terminal, controlling the second initialization sub-circuit to transmit a voltage of the second reset voltage terminal as a reset voltage to the anode of the light-emitting device.

15. The method according to claim 13, the pixel driving circuit further includes: a first initialization sub-circuit and a second initialization sub-circuit; the first initialization sub-circuit is coupled to a fourth control signal terminal, a first reset voltage terminal and the control terminal of the first transistor; the second initialization sub-circuit is coupled to a fifth control signal terminal, a second reset voltage terminal and the anode of the light-emitting device; the driving cycle of the driving method for the pixel driving circuit further includes a refresh phase; and the method further comprises:

in the refresh phase, through the fourth control signal terminal, controlling the first initialization sub-circuit to transmit a voltage of the first reset voltage terminal as a reset voltage to the control terminal of the first transistor; and in the charging phase, through the fifth control signal terminal, controlling the second initialization sub-circuit to transmit a voltage of the second reset voltage terminal as a reset voltage to the anode of the light-emitting device.

16. The pixel driving circuit according to claim 2, wherein the second compensation sub-circuit includes a second transistor, a control terminal of the second transistor is coupled to the second control signal terminal, a first terminal of the second transistor is coupled to the second data voltage terminal, and a second terminal of the second transistor is coupled to the control terminal of the first transistor.

17. The pixel driving circuit according to claim 2, wherein the first compensation sub-circuit includes a third transistor and a first transistor; a control terminal of the third transistor is coupled to the first control signal terminal, a first terminal of the third transistor is coupled to the second terminal of the first transistor, and a second terminal of the third transistor is coupled to the control terminal of the first transistor and a first terminal of the first capacitor; a second terminal of the first capacitor is coupled to the first voltage terminal;

the third transistor is configured to be turned on in response to the signal of the second control signal terminal such that the voltage of the second terminal of the first transistor is coupled to the control terminal of the first transistor; and the first capacitor is configured to store the voltage of the control terminal of the first transistor.

18. The pixel driving circuit according to claim 2, wherein the writing sub-circuit includes a fourth transistor, a control terminal of the fourth transistor is coupled to the first control signal terminal, a first terminal of the fourth transistor is coupled to the first data voltage terminal, and a second terminal of the fourth transistor is coupled to the first terminal of the first transistor.

19. The pixel driving circuit according to claim 2, wherein the light-emitting control sub-circuit includes a fifth transistor and a sixth transistor; a control terminal of the fifth transistor is coupled to the third control signal terminal, a first terminal of the fifth transistor is coupled to the second terminal of the first transistor, and a second terminal of the fifth transistor is coupled to the anode of the light-emitting device; and a control terminal of the sixth transistor is coupled to the third control signal terminal, a first terminal of the sixth transistor is coupled to the first voltage terminal, and a second terminal of the sixth transistor is coupled to the first terminal of the first transistor.

20. The pixel driving circuit according to claim 2, further comprising a first initialization sub-circuit and a second initialization sub-circuit, wherein the first initialization sub-circuit is coupled to a fourth control signal terminal, a first reset voltage terminal and the control terminal of the first transistor, and is configured to transmit a voltage of the first reset voltage terminal as a reset voltage to the control terminal of the first transistor in response to a signal of the fourth control signal terminal; and the second initialization sub-circuit is coupled to a fifth control signal terminal, a second reset voltage terminal and the anode of the light-emitting device, and is configured to transmit a voltage of the second reset voltage terminal as a reset voltage to the anode of the light-emitting device in response to a signal of the fifth control signal terminal.

* * * * *